US008438759B2

(12) United States Patent
Imamura et al.

(10) Patent No.: US 8,438,759 B2
(45) Date of Patent: May 14, 2013

(54) VIBRATION DAMPING DEVICE AND BUCKET FOR CONSTRUCTION MACHINE

(75) Inventors: Kazuya Imamura, Kanagawa (JP); Kuniaki Nakada, Kanagawa (JP); Taizou Nakagawa, Toyama (JP)

(73) Assignee: Komatsu, Ltd., Tokyo (JP)

( * ) Notice: Subject to any disclaimer, the term of this patent is extended or adjusted under 35 U.S.C. 154(b) by 444 days.

(21) Appl. No.: 12/782,012

(22) Filed: May 18, 2010

(65) Prior Publication Data

US 2010/0218403 A1 Sep. 2, 2010

Related U.S. Application Data

(62) Division of application No. 12/071,525, filed on Feb. 21, 2008, now Pat. No. 7,743,881, which is a division of application No. 10/526,224, filed as application No. PCT/JP03/11181 on Sep. 2, 2003, now Pat. No. 7,681,689.

(30) Foreign Application Priority Data

| Sep. 2, 2002 | (JP) | 2002-256826 |
| Nov. 14, 2002 | (JP) | 2002-330854 |
| Mar. 20, 2003 | (JP) | 2003-78931 |

(51) Int. Cl.
*E02F 3/40* (2006.01)
(52) U.S. Cl.
USPC .......................................................... 37/444
(58) Field of Classification Search .................. 37/200, 37/228, 443, 444, 199, 227, 229, 445, 441, 37/379, 393; 404/77, 79, 95; 172/810, 811, 172/772, 772.5; 414/722, 725
See application file for complete search history.

(56) References Cited

U.S. PATENT DOCUMENTS

| 2,011,988 A | 8/1935 | Timian |
| 2,541,159 A | 2/1951 | Geiger |
| 2,764,136 A | 9/1956 | Gadd |
| 3,102,722 A | 9/1963 | Hamontre |
| 3,645,021 A | 2/1972 | Sonerud |
| 3,648,828 A | 3/1972 | McCaffrey, Jr. et al. |
| 3,966,026 A | 6/1976 | Fillderman |

(Continued)

FOREIGN PATENT DOCUMENTS

| FR | 2602256 | 2/1998 |
| JP | 56-55061 | 5/1981 |

(Continued)

OTHER PUBLICATIONS

International Search Report issued Dec. 16, 2003.

(Continued)

*Primary Examiner* — Robert Pezzuto
(74) *Attorney, Agent, or Firm* — Wenderoth, Lind & Ponack, LLP

(57) ABSTRACT

A bucket for a construction machine including a side plate (11); a bottom plate (12), at least a portion of which is connected to the side plate (11); and a laminated plate (20) that is attached to an outside of the side plate (11). At least a part (16) of the portion where the side plate (11) and the bottom plate (12) are connected on an inside of the side plate (11) and the bottom plate (12) is reinforced.

5 Claims, 25 Drawing Sheets

U.S. PATENT DOCUMENTS

| | | |
|---|---|---|
| 4,045,057 A | 8/1977 | Halter |
| 4,064,975 A | 12/1977 | Fillderman |
| RE29,603 E * | 4/1978 | Oke et al. ................ 414/722 |
| 4,185,877 A | 1/1980 | Tanoue et al. |
| 4,250,760 A | 2/1981 | Gurries |
| 4,273,207 A | 6/1981 | Sivers et al. |
| 4,467,539 A | 8/1984 | Gurries |
| 4,516,658 A | 5/1985 | Scarton et al. |
| 4,560,113 A | 12/1985 | Szalanski |
| 4,592,696 A | 6/1986 | Cartnerock |
| 4,938,152 A | 7/1990 | List |
| 5,160,034 A | 11/1992 | Potter |
| 5,195,865 A | 3/1993 | Koehl |
| 5,240,221 A | 8/1993 | Thomasen |
| 5,307,570 A | 5/1994 | Brown |
| 5,435,083 A | 7/1995 | Thompson |
| 5,526,591 A * | 6/1996 | Otwell ........................ 37/444 |
| 5,528,005 A | 6/1996 | Bschorr et al. |
| 5,583,324 A | 12/1996 | Thomasen |
| 5,585,588 A | 12/1996 | Tumura |
| 5,629,503 A | 5/1997 | Thomasen |
| 5,631,451 A | 5/1997 | Torisaka et al. |
| 5,691,516 A | 11/1997 | Thomasen |
| 5,734,133 A | 3/1998 | Mayer et al. |
| 5,946,832 A | 9/1999 | Koivuranta et al. |
| 6,173,805 B1 | 1/2001 | Thomasen |
| 6,177,173 B1 | 1/2001 | Nelson |
| 6,230,424 B1 * | 5/2001 | Renski et al. ................ 37/446 |
| 6,279,679 B1 | 8/2001 | Thomasen |
| 6,318,007 B1 * | 11/2001 | Morlock ........................ 37/444 |
| 6,332,509 B1 | 12/2001 | Nishikawa |
| 6,536,555 B1 | 3/2003 | Kelsic et al. |
| 6,550,868 B2 | 4/2003 | Kobayashi et al. |
| 6,638,640 B2 | 10/2003 | Jee |
| 7,296,654 B1 | 11/2007 | Berman |

FOREIGN PATENT DOCUMENTS

| | | |
|---|---|---|
| JP | 56-159457 | 11/1981 |
| JP | 59-159457 | 11/1981 |
| JP | 57-119851 | 7/1982 |
| JP | 2000-219168 | 8/2000 |
| JP | 2000-279890 | 10/2000 |
| JP | 2000-328813 | 11/2000 |
| JP | 2001-032210 | 2/2001 |
| JP | 2001-32210 | 2/2001 |
| JP | 2002-48188 | 2/2002 |
| JP | 2003-105794 | 4/2003 |
| JP | 2003-176543 | 6/2003 |
| WO | 00/31436 | 6/2000 |

OTHER PUBLICATIONS

Notification of Reasons for Refusal issued May 30, 2006.
Official Action dated Jul. 22, 2009 in corresponding U.S. Appl. No. 10/526,224, filed Mar. 1, 2005.

* cited by examiner

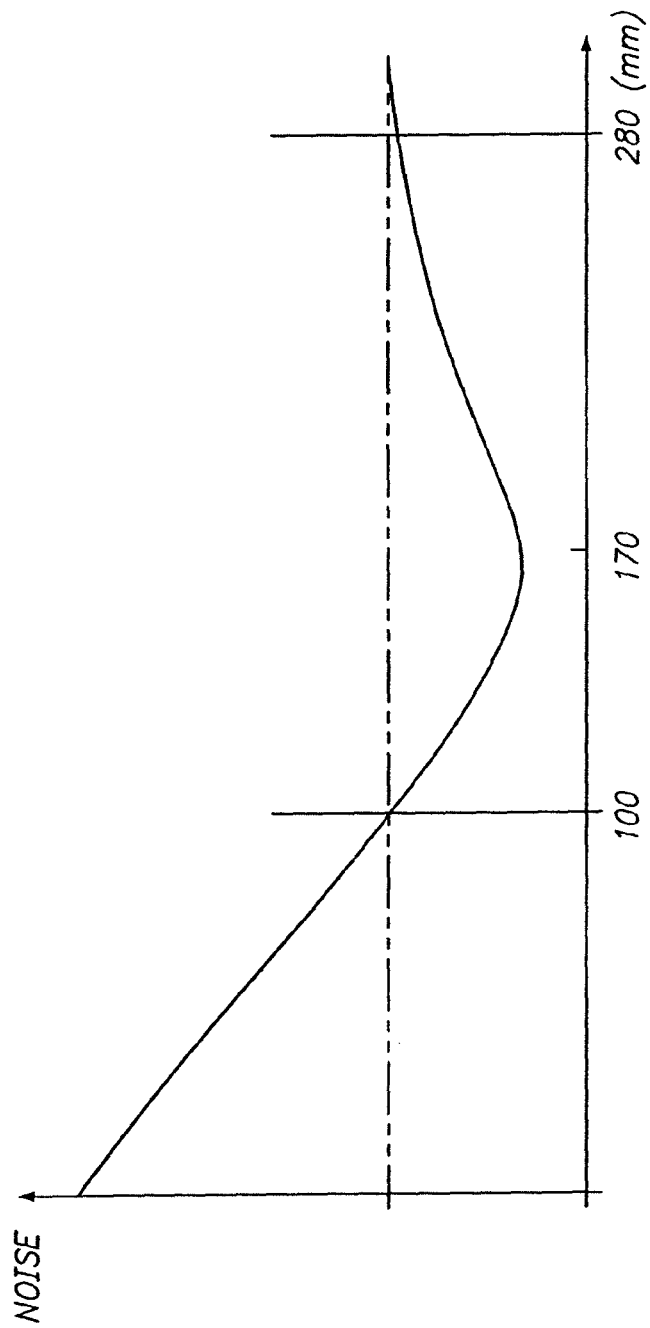

| ITEM NO. | NOISE ENERGY REDUCTION RATE (%) | | |
|---|---|---|---|
| | SIDE PLATE CONTRIBUTION | BOTTOM PLATE CONTRIBUTION | OVERALL |
| 1 | 26 | 0 | 10 |
| 2 | 50 | 13 | 27 |
| 3 | 51 | 19 | 31 |
| 4 | 7 | 48 | 32 |
| 5 | 82 | 68 | 73 |
| 6 | 57 | 61 | 59 |
| 7 | 29 | 49 | 41 |
| 8 | 58 | 22 | 36 |
| 9 | 30 | 2 | 13 |
| 10 | 57 | 19 | 34 |
| 11 | 80 | 70 | 74 |
| 12 | 64 | 67 | 66 |

VIBRATION DAMPING DEVICE AND BUCKET FOR CONSTRUCTION MACHINE

This is a divisional application of Ser. No. 12/071,525, filed Feb. 21, 2008, now U.S. Pat. No. 7,743,881 which is a divisional application of Ser. No. 10/526,224, filed Mar. 1, 2005, now U.S. Pat. No. 7,681,689, which is the National Stage of International Application No. PCT/JP2003/011181, filed Sep. 2, 2003.

BACKGROUND OF THE INVENTION

1. Technical Field

The present invention relates to a vibration damping device which suppresses vibration generated by a base material so that noise emitted from the base material is reduced, and a bucket for a construction machine.

2. Description of Related Art

In recent years, low noise levels have been required in construction machinery, especially in the case of nighttime work and in residential areas, and legal noise regulations which restrict noise to fixed levels or lower have also been enacted in various countries. For example, in the case of hydraulic excavators equipped with work equipment including buckets, it has been confirmed by experiment that such buckets are the main source of noise. It has been claimed that approximately 80% of the noise emitted from such work equipment is noise emitted from buckets.

Accordingly, attempts have been made to attach vibration damping materials to buckets in order to suppress the vibration that is generated in the buckets, especially the side plates of the buckets, and thus reduce the noise that is emitted from these side plates. Vibration damping materials used in such cases have generally been materials called viscoelastic materials, such as rubber, resins, asphalt or the like.

However, construction machinery is commonly used to perform work under harsh conditions, with the work equipment exposed to earth, sand and the like, and if vibration damping materials consisting of viscoelastic materials are attached to the work equipment, the problem of insufficient durability arises. Furthermore, such viscoelastic materials are generally constrained by metal plates, and in cases where these metal plates are repaired by welding, the problem of burning of the viscoelastic materials also arises. Since such viscoelastic materials are expensive, the problem of high cost of noise countermeasures also arises.

Accordingly, in response to the demand for the development of a low-cost vibration damping device which has a high durability and involves no burning during repair, the assignee of the present application has already developed a laminated plate and filed a patent application for this plate, which has been disclosed in Japanese Patent Application Laid-Open No. 2000-219168 (or U.S. Pat. No. 6,332,509), Japanese Patent Application Laid-Open No. 2002-48188 and the like. With respect to the abovementioned publications, an explanation will be made with reference to FIG. 2. A plurality of thin steel plates 21 (hereafter referred to as "thin plates 21") are laminated on the side plate 11 of the bucket, thus forming laminated plate 20. It is indicated that relatively thick steel plate 30 (hereafter referred to as "protective plate 30") that protect the thin plates 21 is further superimposed on top of the laminated plate 20, and that the periphery 20a (see FIG. 1) is fastened by performing all round fillet welding or intermittent fillet welding, or by performing intermittent plug welding, bolt fastening or the like. Since the laminated plate 20 is constructed from an inexpensive material that has a high durability and is resistant to burning, i. e., steel, the problem points encountered in conventional viscoelastic materials can be solved.

The mechanism whereby the laminated plate 20 suppresses the vibration generated in the side plate 11 and thus reduces the noise emitted from the side plate 11 is described in the abovementioned publications; this mechanism will be described with reference to FIGS. 4A and 4B. Specifically, when the side plate 11 vibrates, this vibration is transmitted to the laminated plate 20, so that the thin plates 21, 21' constituting the laminated plate 20 undergo deformation. In the laminated plate 20 in which numerous thin plates 21, 21' are superimposed, the amount of deformation differs in each layer. Specifically, the respective curvature radii r1 and r2 differ in adjacent thin plates 21, 21'. Accordingly, in the thin plates 21, 21' in which the original displacement was X (see FIG. 4A), the displacement respectively varies to X+ΔX2 and X+ΔX1 as a result of the microscopic displacement caused by the vibration, so that a relative displacement of ΔX2−ΔX1 is generated between the two thin plates 21 and 21'. This relative displacement of ΔX2−ΔX1 causes the generation of a frictional force (hereafter referred to as an "inter-layer frictional force") between the thin plates 21 and 21'. The vibration energy generated in the side plate 11 is converted into thermal energy by this inter-layer frictional force. As a result, the vibration generated in the side plate 11 is suppressed so that the noise emitted from the side plate 11 is reduced.

Accordingly, as is shown in FIG. 4B, the independent deformation of the thin plates 21 and 21' so that a relative displacement of ΔX2−ΔX1 is generated is a condition for performing vibration damping. Conversely, therefore, if the two thin plates 21 and 21' are fastened in place so that these plates function as an integral unit, the independent deformation is hindered, so that there is absolutely no generation of a relative displacement or very little generation of a relative displacement; as a result, no vibration damping effect is obtained, or an extremely small vibration damping effect is obtained.

This will be explained with reference to FIG. 1. In a conventional device, the peripheries 20a of the laminated plate 20 are fastened to the side plate 11 by welding or the like. However, in a common conventional structure, the interior parts (used in the sense of the portions other than the peripheries 20a) of the laminated plate 20 are not fastened to the side plate 11, so that the independent deformation of the respective layers is not impeded, thus producing a high vibration damping effect. However, it has become clear that the following problems arise if the interior parts of the laminated plate 20 are not fastened.

First of all, gaps are generated between the thin plates 21 and 21' that constitute the laminated plate 20, and gaps are generated between the side plate 11 and the laminated plate 20, by the thermal strain that is generated in the welding process during manufacture. As a result, the frictional force that should inherently occur between the thin plates 21 and 21' during the vibration of the side plate 11 either does not occur or occurs to only a very slight extent, so that a vibration damping effect is either completely absent or present to a very slight extent.

Secondly, during actual work performed by construction machinery, excessively large external forces are commonly applied to the side plate 11 as a result of the bucket striking rocks and the like. Consequently, the laminated plate 20 in which the internal portions are not fastened and only the peripheries 20a are fastened is easily caused to "float upward" by these excessive external forces. In other words, the laminated plate 20 separates from the side plate 11, and the thin plates 21 and 21' separate from each other. As a result, the inter-layer frictional force that should be generated between the thin plates 21 and 21' during the vibration of the side plate 11 is either not generated at all or generated only to a very slight extent, so that a vibration damping effect is either not obtained at all or obtained only to a very slight extent.

Thus, in order to obtain a high vibration damping effect, it is desirable that the internal portions of the laminated plate 20 not be fastened, so that the deformation of the thin plates 21 is not impeded. However, if the internal portions of the laminated plate 20 are not fastened, "floating" occurs as a result of thermal strain during the manufacture of the bucket and external forces during the use of the bucket, so that the problem of a loss of the vibration damping effect arises.

Furthermore, the types of buckets used in construction machinery vary widely according to the size, specifications and working applications of the construction machinery. When the present inventors performed experiments on various types of buckets with different sizes, shapes, dimensions and the like, and confirmed the effect obtained by attaching laminated plate to the side plate, the inventors discovered that the effect varies according to the type of bucket involved. Specifically, depending on the type of bucket involved, there are cases in which the contribution of the side plate to noise is large, and cases in which the contribution of the side plate to noise is small and the contribution of the bottom plate to noise is large. The following countermeasures are conceivable in such cases.

(1) The contribution to noise is measured for various types of buckets, and in the case of buckets in which the contribution of the bottom plate to noise is large, noise countermeasures are taken with respect to the bottom plate as well.

(2) Noise countermeasures are uniformly taken in the bottom plate for all types of buckets.

However, in cases where the method of the abovementioned (1) is adopted, noise experiments and the like must be performed each time that a bucket is newly designed, which involves considerable trouble. Furthermore, in cases where the method of the abovementioned (2) is adopted, it is necessary to add parts used for noise countermeasures even in the case of buckets that do not require noise countermeasures, so that the cost is increased.

Accordingly, it is desirable to set clear standards for the requirement of noise countermeasures with respect to the bottom plate, and to perform noise countermeasures using the minimum required effort for the minimum required buckets among the various types of buckets, without performing noise experiments or the like. On the other hand, in cases where noise counter measures are performed on the bottom plates of buckets, there are instances in which laminated plate cannot be attached (unlike the case of the side plate). Specifically, during the work performed by construction machinery, the bottom plate of the bucket often has occasion to strike rocks or the like; accordingly, compared to the side plate, the bottom plate is more frequently subjected to excessive external forces, so that the bottom plate is subjected to severe wear. Accordingly, there is a danger that the laminated plate attached to the bottom plate will be destroyed or separated, and is therefore deficient in durability. Furthermore, in cases where laminated plate is attached to the bottom plate, the problem of increased cost also arises.

Therefore, in order to avoid such problems, it is conceivable that vibration damping might be performed while increasing the rigidity of the bottom plate by reinforcing the bottom plate with a reinforcing material. Depending on the type of bucket involved, there may be buckets in which reinforcing members with a large thickness (called wear plates) are attached to the portions of the side plate of the bucket that are close to the bottom plate, and it is conceivable that vibration damping of the bottom plate might be performed by increasing the thickness of such wear plate. However, increasing the thickness of the wear plate leads to an increase in the weight of the bucket, and thus has a deleterious effect on the performance of the construction machinery. Specifically, when the weight of the bucket is increased, the inertial moment of the work equipment increases, so that it is necessary to increase the counter-weight by a corresponding amount. When the counter-weight is increased, the problem of an increase in the turning radius of the construction machinery arises. Accordingly, it is desirable that reinforcement of the bottom plate of the bucket be performed with the minimum necessary increase in weight.

Furthermore, a vibration damping device using a laminated plate in which a plurality of plates are partially coupled is known as a vibration damping device which has an effect on noise reduction in the machinery, and which is compact and superior in terms of durability. Furthermore, bolt fastening, plug welding or complete-periphery welding is used as such partial coupling (for example, see the abovementioned Japanese Patent Application Laid-Open No. 2002-48188, pages 3 through 5, and FIGS. 1 through 8). In vibration damping devices using the laminated plate since the laminated plate is partially coupled to the noise generating parts (vibrating parts), very small positional deviations or gaps are generated between the vibrating parts and laminated plate and between the plates that make up the laminated plate when the noise generating parts vibrate. Since these very small positional deviations and gaps successively arise while constantly varying, friction and impacts between the plates are repeated. Accordingly, the vibrational energy of the noise generating parts is converted into thermal energy by the friction and impacts, and is diffused, so that the vibration can be reduced, thus reducing the noise.

However, in the case of such conventional techniques, problems such as those described below arise. Specifically, in cases where such techniques are applied to the side plate of the bucket in a hydraulic excavator, if bolt fastening or plug welding is used for the partial coupling of the side plate and laminated plate, rain water enters via the end surfaces of the laminated plate so that rusting occurs between the plates, thus causing a drop in the vibration damping performance. If all round welding of the end surfaces of the laminated plate is used for the partial coupling of the side plate and laminated plate in order to prevent rusting, the plates forming the laminated plate are mutually constrained, so that the generation of very small positional deviations and the like is impeded, thus causing a drop in the vibration damping performance.

The application of laminated plate such as shown in FIG. 29 to the side plates of the bucket is conceivable as one example of a technique that can protect the welded parts of the laminated plate. In the bucket 101, side plates 103, 103 are respectively welded to both sides of a bottom plate 102 which is bent into substantially a C shape. Furthermore, edge plates 104, 104 and 105 are respectively welded to the side plates 103, 103 and bottom plate 102 to form the opening part of the bucket 101. A plurality of teeth 106 are mounted on the edge plate 105. Pin bosses 107 which are connected to the work equipment of the hydraulic excavator are disposed on the end part located on the opposite side from the tooth attachment part of the bottom plate 102. Wear plate 108 is disposed on the peripheral parts of the outside surfaces of the side plate 103 so that the wear plate 108 runs along the bottom plate 102. Laminated plate 150 is bonded to the outside surfaces of the side plate 103 so that the laminated plate 150 is surrounded by the edge plate 104 and wear plate 108. As is shown in FIG. 30, the laminated plate 150 comprises an inner plate 151 consisting of a specified number of laminated thin steel plates, and an outer plate 152 with a specified thickness which is laminated on the outside of the inner plate 151, and which retains and protects the inner plate 151. These plates are bonded to the side plate 103 so that the side plate 103, inner plate 151 and outer plate 152 show substantially tight adhesion to each other. A gap d1 is formed between the laminated plate 150 and the wear plate 108 as welding margins for the welding of the laminated plate 150 and wear plate 108 to the side plate 103. Furthermore, as is shown in FIG. 31, a gap d2 is formed between the laminated plate 150 and the edge plate 104 as welding margins for the welding of the laminated plate 150 and edge plate 104 to the side plate 103. For example, as is shown in FIGS. 32A and 32B, both gaps d1 and d2 are embedded by repeating fillet welds twice. Specifically, laminated plate 150 is bonded to the side surface of the bucket 101 by all round welding.

As a result of the abovementioned construction, noise during excavation work can be reduced by the dissipation of vibrational energy by the inner plate 151 of the laminated plate 150 as thermal energy. Furthermore, the laminated plate 150 disposed on the side surfaces of the bucket 101 prevents the entry of rain water into the interior parts of the laminated plate as a result of the all round welding, and thus prevents the occurrence of rusting between the plates, so that the vibration damping performance can be maintained. Moreover, the edge plate 104 and wear plate 108 protect these welded parts from friction or impact with rocks and the like during excavation work; accordingly, wear and damage of the welded parts of the laminated plate 150 can be prevented, so that the durability of the laminated plate 150 can be improved.

However, the following problems are encountered even in cases where the abovementioned wear plate 108 is used.

(1) The laminated plate that converts the vibrational energy into thermal energy arising from friction between the plates, and thus dissipates this energy, shows an improved vibration damping performance as the number of points of constraint is reduced. However, the inner plate 151 of the laminated plate 150 is constrained around the entire periphery by all round welding of the periphery, so that the vibration damping performance drops. Conversely, in cases where the peripheries of the laminated plate 150 are intermittently welded in order to reduce the number of points of constraint and improve the vibration damping performance, rusting occurs as a result of the invasion of the interior parts by rain water.

(2) If specified gap d1 is not ensured between the laminated plate 150 and the wear plate 108 during manufacture, a sufficient welding quality cannot be obtained. Considerable work is required in order to position the inner plate 151 and outer plate 152 so that the gap d1 is ensured; as a result, the cost is increased.

(3) Since the volume of the welded parts is large, the cost increases with the amount of work that is required. Conversely, if the peripheries of the laminated plate 150 are intermittently welded in order to reduce the amount of welding, rusting occurs as a result of the invasion of the interior parts by rain water as in the case of the abovementioned (1).

(4) In order to prevent floating and deformation caused by thermal strain during continuous welding, it is necessary to effect a temporary attachment of the laminated plate 150 and side plate 103 at an extremely large number of points, so that considerable work is required, and the cost is increased.

Furthermore, as an example of another application in which laminated plate is bonded, there is an application in which laminated plate 160 (comprising a specified number of inner plates 161 and an outer plate 162) is bonded to the inclined plate 172 of the hopper 171 of a crusher 170 as shown (for example) in FIG. 33. In this case, it is conceivable that all round welding might be used in order to prevent foreign matter such as water or the like from invading the interior parts of the laminated plate. In this case as well, since the entire periphery of each of the inner plates 161 of the laminated plate 160 is constrained by all round welding as in the abovementioned (1), the vibration damping performance drops. Conversely, if the peripheries of the laminated plate 160 are intermittently welded in order to improve the vibration damping performance, rusting occurs as a result of the invasion of the interior parts by water and the like.

SUMMARY OF THE INVENTION

The present invention was devised in order to solve such problems encountered in the prior art; it is an object of the present invention to provide a vibration damping device in which a high vibration damping effect can be maintained by fastening appropriate parts in the interior part of the laminated plate so that there is no loss of the vibration damping effect due to thermal strain during manufacture or the occurrence of "floating" caused by external forces during use, and so that there is no interference with the independent deformation of the thin plates that make up the laminated plate. Furthermore, it is an object of the present invention to provide a bucket for a construction machine which is devised so that noise countermeasures can be taken with the minimum required effort, without performing noise experiments or the like on the bucket, and which makes it possible to reinforce the bottom plate of the bucket with the minimum required increase in weight. Moreover, it is an object of the present invention to provide a vibration damping device which is superior in terms of vibration damping performance, and which can prevent the generation of noise in the internal portions.

In order to achieve the abovementioned object, the first aspect of a vibration damping device of the present invention is a vibration damping device comprising a laminated plate in which at least an interior part thereof is fastened to a base material that emits noise, characterized in that the interior part is a part other than a part that forms a loop of a vibration mode when the base material is caused to vibrate in the vibration mode at a specified frequency.

Below, some of the effects and merits of the present invention will be described with reference to the attached figures and reference symbols in the figures in order to facilitate understanding However, the attached figures and reference symbols in the figures merely indicate examples, and do not limit the present invention. In the abovementioned first construction, as is shown in FIG. 3, when the laminated plate 20 is fastened to the base material 11, a part G other than a part E that forms a loop of the vibration mode 1 at a specified frequency when the base material 11 is caused to vibrate in this vibration mode 1 is fastened.

When the amplitude distribution of the vibration is taken in a case where the base material 11 is caused to vibrate in the vibration mode 1 at a specified frequency, the size of the amplitude varies according to the part even in the case of the same structure, as is shown in FIG. 5A. Specifically, there is a part (PH in FIG. 5A) where the amplitude is large, i. e., the part that forms a loop of the vibration mode 1, and a part (PL in FIG. 5A) where the amplitude is small, i.e., the part that forms a node of the vibration mode 1. In the part where the amplitude is large, the amount of deformation of the thin plates 21, 21' that form the laminated plate 20 is also large, and the frictional force between layers is also large.

Here, if the laminated plate 20 is fastened to the base material 11 in the part E that forms the loop of the vibration mode 1, the independent deformation of the thin plates 21, 21' that make up the laminated plate 20 is impeded, so that the inter-layer frictional force is either completely eliminated or else is extremely small. Consequently, a vibration damping effect arising from the laminated plate 20 is either not obtained at all, or else is obtained only to a very slight extent. Accordingly, the laminated plate 20 is fastened to the base material 11 in the part other than the part E that forms the loop of the vibration mode 1; in concrete terms, the laminated plate 20 is fastened in the part G that forms the node of the vibration mode 1.

The part G that forms the node of the vibration mode 1 is inherently a part where the deformation of the thin plates 21, 21' that make up the laminated plate 20 is either small or almost non-existent. Accordingly, even if fastening is performed in this part, the vibration damping effect that is lost is either extremely small or almost non-existent. Consequently, the deleterious effect on the vibration damping effect caused by the fastening of the laminated plate 20 can be suppressed to a minimum. Thus, in the first construction, since the construction is devised so that the optimal part G in the interior parts of the laminated plate 20 is fastened, there is no loss of the vibration damping effect due to thermal strain during manufacture or the occurrence of "floating" caused by external forces during use. Furthermore, the independent deformation of the thin plates 21 that make up the laminated plate 20 is not impeded, so that a high vibration damping effect can be maintained.

The second aspect of a vibration damping device is a vibration damping device comprising a laminated plate in which at least an interior part thereof is fastened to a base material that emits noise, characterized in that the interior part is a part other than a part that forms a loop with respect to a plurality of vibration modes when the base material is caused to vibrate in respective vibration modes at a plurality of frequencies.

In this second construction, as is shown in FIGS. 5A through 5D, when the base material 11 is fastened to the laminated plate 20, the part G in the internal part other than the part that forms a loop with respect to a plurality of vibration modes 1, 2, 3 and 4 when the base material 11 is caused to vibrate in the respective vibration modes 1, 2, 3 and 4 with different frequencies is fastened. Since the device is devised so that the part G where the deformation of the thin plates 21, 21' that make up the laminated plate 20 is either small or almost non-existent with respect to the respective vibrations modes 1, 2, 3 and 4 at a plurality of frequencies is fastened, the deleterious effect on the vibration damping effect caused by the fastening of the laminated plate 20 over a plurality of frequencies can be suppressed to a minimum, so that noise caused by the mixing of a plurality of frequency components can be reduced.

The third aspect of a vibration damping device is a vibration damping device comprising a laminated plate in which at least an interior part thereof is fastened to a side plate of a bucket of a construction machine, characterized in that the interior part is within a region G comprising i) a part D consisting of a center point d of a line segment BC that connects a point B where a line segment CA that connects a circular arc center C of the side plate which has a substantially circular arc shape in at least a portion of one side and a point A where there is a transition from the substantially circular arc shape to another shape on a side of attachment of the bucket to the construction machine intersects with the laminated plate, and the circular arc center C, and an area in the vicinity of the center point d, ii) a part F consisting of a center point f of the line segment CA and an area in the vicinity of the center points f, and iii) a region between the part D and part F.

Specifically, as is shown in FIGS. 5A through 5D, it has been confirmed that when the side plate 11 is caused to vibrate in respective vibration modes 1, 2, 3 and 4 at a plurality of frequencies, the parts other than the loop of the vibration modes for all of the frequencies are in the region G, as shown in FIG. 1. Here, the side plate 11 is one concrete example of the base material 11. In this third construction, if (for example) the part D within the region G is fastened, the deleterious effect on the vibration damping effect caused by the fastening of the laminated plate 20 can be suppressed to a minimum.

The first aspect of a bucket for a construction machine of the present invention is a bucket for a construction machine comprising a side plate, a bottom plate, at least a portion of which is connected to the side plate, and a laminated plate which is attached to the side plate, characterized in that in cases where a ratio Wp/Hs of a width Wp of a bottom plate to a height Hs of the side plate is 1.47 or greater, at least a part of the portion where the side plate and bottom plate are connected is reinforced.

In this first bucket construction, the standard for the requirement of noise countermeasures in the bottom plate is clearly defined as "the ratio Wp/Hs of the width Wp of the bottom plate to the height Hs of the side plate being 1.47 or greater", and the bottom plate is reinforced according to this standard. As a result, noise countermeasures can be taken with the minimum required effort only in the case of buckets that require noise countermeasures (among the various types of buckets), without performing noise experiments or the like.

The second aspect of a bucket for a construction machine is a bucket for a construction machine comprising a side plate, a bottom plate, at least a portion of which is connected to the side plate, and a laminated plate which is attached to the outside of the side plate, characterized in that in cases where a ratio Wp/Hs of a width Wp of the bottom plate to a height Hs of the side plate is 1.47 or greater, a part, which forms a loop of a vibration mode, of the potion where the side plate and bottom plate are connected is reinforced.

In this second bucket construction, as in the abovementioned first bucket construction, the construction is devised so that the bottom plate is reinforced according to a standard indicating the need to reinforce the bottom plate; accordingly, noise countermeasures can be performed using the minimum required effort. Furthermore, since the construction is devised so that the part that forms the loop of the vibration mode (among the respective parts where the side plate and bottom plate are connected) is reinforced, the minimum necessary reinforcement of the bottom plate can be performed, so that the deleterious effect on the performance of the construction machine can be suppressed to a minimum.

The third aspect of a bucket for a construction machine is a bucket for a construction machine comprising a side plate, a bottom plate, at least a portion of which is connected to the side plate, and a laminated plate which is attached to the side plate, characterized in that in cases where a ratio Wp/Hs of a width Wp of the bottom plate to a height Hs of the side plate is 1.47 or greater, a connecting member that connects the side plate and bottom plate is provided so that a ratio Wp'/Hs of a substantial width Wp' of the bottom plate to the height Hs is less than 1.47.

In this third bucket construction, as in the case of the abovementioned first bucket construction, noise countermeasures can be performed with the minimum required effort. Furthermore, the noise emitted from the bottom plate is reduced by attaching connecting members so that the ratio Wp'/Hs is less than 1.47. In addition, since the construction is devised so that the noise emitted from the side plate is reduced by attaching the laminated plate in a state in which the ratio Wp'/Hs is less than 1.47, the noise emitted from the bucket can be maximally reduced in the most efficient manner.

The fourth aspect of a bucket for a construction machine is a bucket for a construction machine comprising a side plate, a bottom plate, at least a portion of which is connected to the side plate, and a laminated plate which is attached to the side plate, characterized in that at least a part of the portion where the side plate and bottom plate are connected on insides of the side plate and bottom plate is reinforced.

In this fourth construction, since the noise emitted from the bottom plate is reduced, not only the noise from the sides of the bucket but also the noise from the front of the bucket is reduced. Furthermore, as a result of the increased rigidity of the bucket as a whole, the noise from the sides is reduced to a greater extent than before reinforcement. Moreover, since only the inside connected parts of the bucket are reinforced, the weight increase caused by the reinforcing material is smaller than in cases where a reinforcing member such as a wear plate is disposed on the outside of the bucket.

The fourth aspect of a vibration damping device is a vibration damping device comprising a laminated plate formed by laminating a specified number of inner plates and an outer plate that is disposed on the outside of the specified number of inner plates, characterized in that the specified number of inner plates are tightly sealed by the outer plate and a machine that is the object of vibration damping.

Preferably, furthermore, this is a vibration damping device comprising a laminated plate formed by laminating a specified number of inner plates, and an outer plate which is disposed on outsides of the specified number of inner plates and which has a shape that differs from those of the inner plates, the inner plates are caused to contact members of the machine that is the object of vibration damping, and the laminated plate is coupled to the members of the machine by performing continuous welding on the peripheral edges of the outer plate. In this construction, the invasion of rain water is prevented by performing continuous welding (all round welding) of the outer plate of the laminated plate so that the occurrence of rusting between the plates can be prevented.

The vibration damping device may also be devised so that when the laminated plate is coupled to members of the machine, intermittent welding consisting of welding in a plurality of locations is performed on the peripheral edges of the inner plates. In this construction, since the degree of constraint of the inner plates is lowered by using intermittent welding on the peripheral edges of the inner plates, superior vibration damping characteristics can be obtained, and a vibration damping device which has a conspicuous noise reducing effect can be obtained.

The vibration damping device may also be devised so that the member of the machine has a contact member that is capable of contacting the end portions of the laminated plate, the inner plate has a contact part that protrudes beyond a peripheral edge of the outer plate and contacts with the contact member, and continuous welding that covers the contact part of the inner plate is performed between the peripheral edges of the outer plate and the contact member. In this construction, the specified number of inner plates can easily be positioned by causing the contact parts of the inner plates to contact the contact members on the machine side. Furthermore, temporary fastening for the purpose of preventing floating and deformation caused by thermal strain during continuous welding becomes unnecessary, so that the manufacturing work and cost can be reduced. Moreover, since the contact members on the machine side protect the welded parts of the laminated plate, damage or wear of the welded parts caused by collision or friction with foreign matter can be prevented, so that the durability of the laminated plate can be improved.

The vibration damping device may also be devised so that a plurality of protruding parts that match a peripheral edge shape of the outer plate are disposed on the peripheral edge of the inner plate, and the plurality of protruding parts of the inner plate are intermittently welded by performing continuous welding on the peripheral edge of the outer plate. In this construction, the protruding parts of the inner plates are welded by the continuous welding process of the outer plate so that intermittent welds can be formed. Accordingly, the manufacturing process is simple and inexpensive. Furthermore, since the protruding parts of the inner plates substantially match the peripheral edge shape of the outer plate, these parts can be used for the positioning of the respective plates of the laminated plate so that the positioning work of the respective inner plates and outer plate is easy, and a low-cost vibration damping device can be obtained.

The vibration damping device may also be devised so that a length of the contact parts of the inner plates is 100 to 280 mm. In this construction, since the intermittent welding pitch of the peripheral edges of the inner plates is set at 100 to 280 mm on the basis of test results, an extremely superior noise reduction effect can be obtained.

The vibration damping device may also be devised so that the plurality of protruding parts of the inner plates are disposed at intervals of 100 to 280 mm. In this construction, since the intermittent welding pitch of the peripheral edges of the inner plates is set at 100 to 280 mm on the basis of test results, an extremely superior noise reduction effect can be obtained.

BRIEF DESCRIPTION OF THE DRAWINGS

FIG. 17 shows measured data regarding the relationship between the welding pitch of the inner plates and the generated noise level in the third embodiment;

DETAILED DESCRIPTION OF THE INVENTION

Preferred embodiments of the present invention will be described below with reference to the attached figures. Furthermore, in the embodiments, mainly a construction machine such as a hydraulic excavator or the like comprising work equipment that includes a bucket is envisioned.

Figure 1:
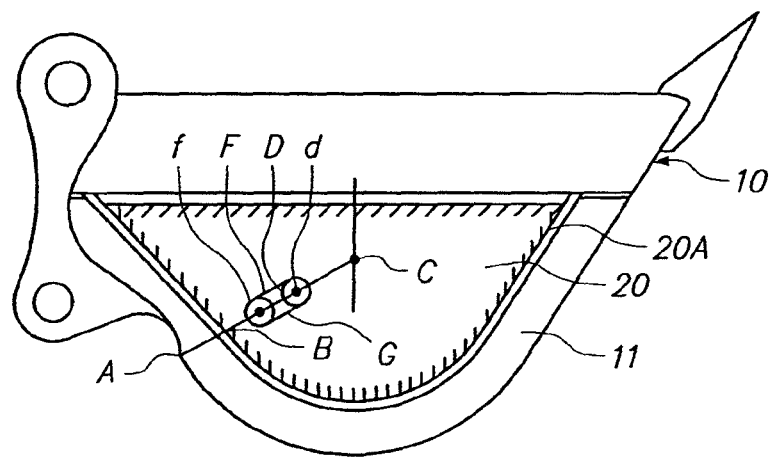
FIG. 1 is a side view of a bucket showing the bucket side plate in a first embodiment of the present invention.
Figure 2:
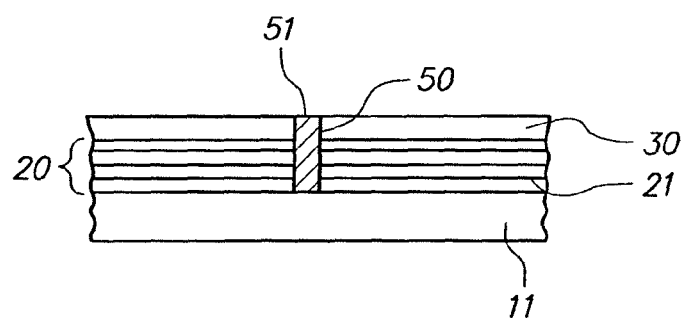
FIG. 2 is a diagram showing a sectional view of the side plate of the bucket shown in FIG. 1.

A case in which the vibration occurring in the side plates of the bucket of a construction machine is suppressed, so that the noise emitted from these side plates is reduced, will be described as a first embodiment. FIG. 1 shows the side plate 11 of the bucket 10 that is the object of vibration damping in the first embodiment, and FIG. 2 shows a sectional view of the side plate 11. As is shown in FIG. 2, a plurality of thin steel plates 21 are laminated on the side plate 11 of the bucket 10, thus forming laminated plate 20. Furthermore, relatively thick steel protective plate 30 that protect the thin plates 21 are further superimposed on the laminated plate 20, and the entire peripheries 20a are fastened to the side plate 11 by fillet welding as indicated by the hatching shown in FIG. 1. The protective plate 30 is installed in order to prevent the thin plates 21 from becoming worn by earth and sand or the like. Furthermore, working in which protective plate 30 is not installed on the laminated plate 20 is also possible. Furthermore, in regard to the method that is used to fasten the peripheries (peripheral edges) of the laminated plate 20 to the side plate 11, besides a method in which fastening is accomplished by all round fillet welding as described above, fastening can also be accomplished by an arbitrary fastening method such as intermittent fillet welding, intermittent plug welding, bolt fastening or the like. For example, these fastening methods are described in Japanese Patent Application Laid-Open No. 2000-219168, U.S. Pat. No. 6,332,509 and Japanese Patent Application Laid-Open No. 2002-48188.

Figure 4A:
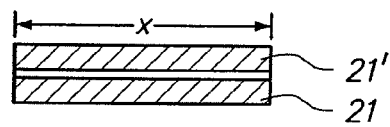
FIGS. 4A and 4B are explanatory diagrams of the deformation of the thin plate in the first embodiment, with FIG. 4A showing the case of non-vibration of the side plate and FIG. 4B showing the case of vibration of the side plate.
Figure 4B:
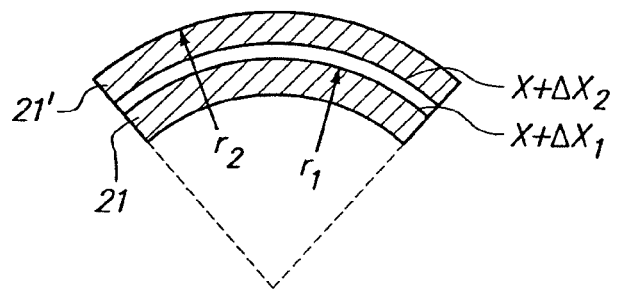

The mechanism whereby the vibration generated in the side plate 11 is suppressed by the laminated plate 20 so that the noise emitted from side plate 11 is reduced will be described with reference to FIGS. 4A and 4B. As is shown in FIG. 4B, when the side plate 11 vibrates, this vibration is transmitted to the laminated plate 20, so that the thin plates 21, 21' that make up the laminated plate 20 undergo deformation. In the laminated plate 20, in which numerous thin plates 21, 21' are superimposed, the amount of deformation is different in each layer. Specifically, since the curvature radii r1 and r2 are different in adjacent thin plates 21, 21', the displacement respectively varies as X+ΔX2, X+ΔX1 as a result of microscopic deformation caused by vibration in the thin plates 21, 21' in which the displacement was originally x (see FIG. 4A). As a result, a relative displacement of ΔX2−ΔX1 occurs between the thin plates 21 and 21'. The relative displacement of ΔX2−ΔX1 causes the generation of a frictional force (hereafter referred to as the inter-layer frictional force) between the thin plates 21 and 21'. The vibrational energy that is generated in the side plate 11 is converted into thermal energy by this frictional force. As a result, the vibration that is generated in the side plate 11 is suppressed, so that the noise that is emitted from the side plate 11 is reduced.

Accordingly, the independent deformation of the thin plates 21, 21' as shown in FIG. 4B so that a relative displacement of ΔX2−ΔX1 is generated is a condition for performing vibration damping. Conversely, if the thin plates 21, 21' are fastened so that these plates act as an integral unit, independent deformation is impeded so that absolutely no relative displacement of ΔX2−ΔX1 is generated, or so that such a relative displacement is generated only to an extremely slight extent. Accordingly, no vibration damping effect is obtained, or only an extremely small vibration damping effect is obtained.

Figure 3:
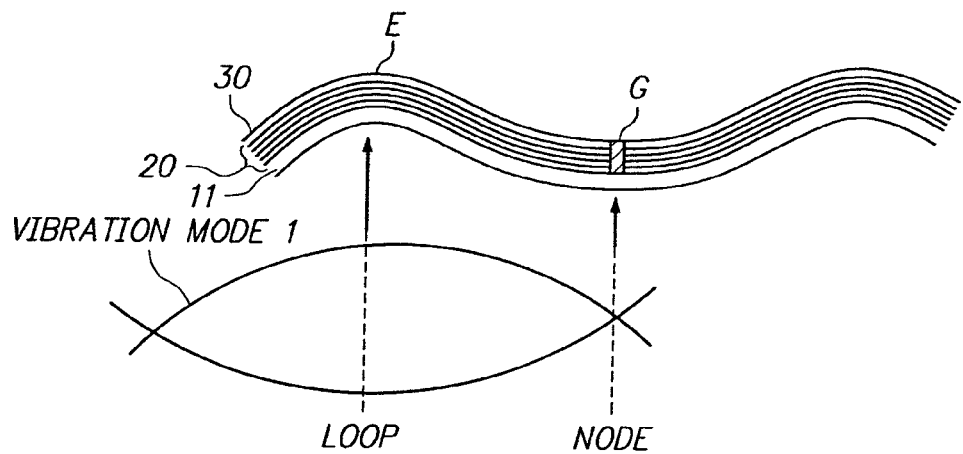
FIG. 3 is a diagram showing the amount of deformation of the laminated plate according to a loop and a node of the vibration mode in order to illustrate the first embodiment.
Figure 5A:
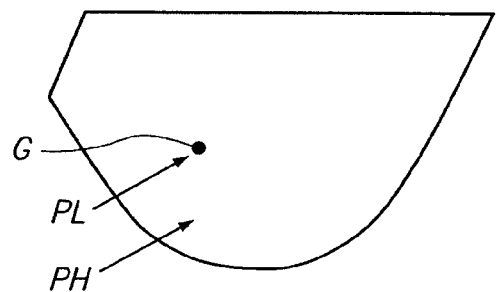
FIGS. 5A through 5D are distribution diagrams showing the size of the amplitude when the side plate in the first embodiment is caused to vibrate in respective vibration modes (PL (in the figures) indicating "a node", PH indicating "a loop", and PM indicating "an intermediate area" (which is not the node but which has a small amplitude)), with FIG. 5A showing the vibration mode 1, FIG. 5B showing the vibration mode 2, FIG. 5C showing the vibration mode 3, and FIG. 5D showing the vibration mode 4.
Figure 5B:
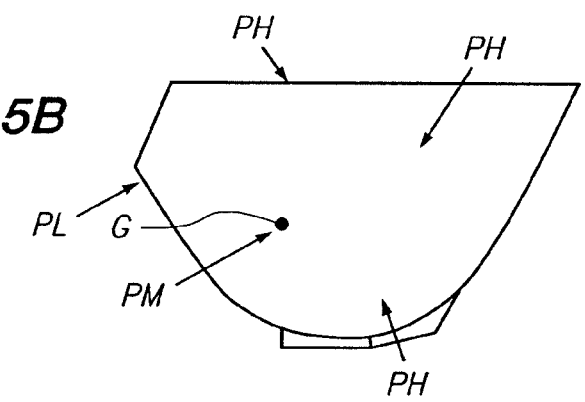
Figure 5C:
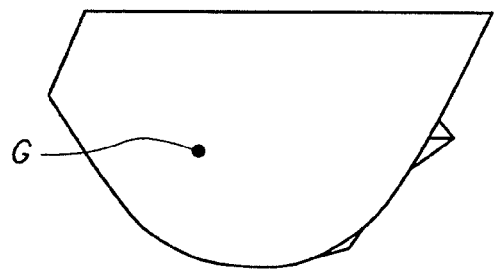
Figure 5D:
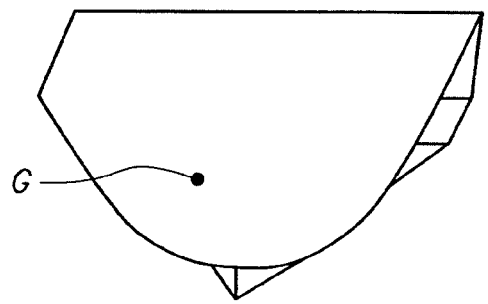

FIG. 3 shows the amount of deformation of the laminated plate 20 corresponding to the loops and nodes of the vibration mode 1 in a case where the base material 11 is caused to vibrate in this vibration mode 1 at a specified frequency. FIG. 5A shows the distribution of the size of the amplitude of the vibration in a case where the base material 11 is caused to vibrate in the abovementioned vibration mode 1; here, the respective parts are indicated by different patterns corresponding to the size of the amplitude. In FIG. 5A, the parts indicated by PH are the parts of loops where the amplitude is large, and the parts indicated by PL are the parts where the amplitude is 0, i. e., the parts of nodes. Thus, even in the case of the same structure, the size of the amplitude differs according to the part; there are both parts where the amplitude is large, i. e., parts that are loops of the vibration mode 1, and parts where the amplitude is small, i. e., parts that are nodes of the vibration mode 1.

In the part E of loops where the amplitude is large, as is shown in FIG. 3, the amount of deformation of the thin plates 21, 21' that make up the laminated plate 20 is large, and the inter-layer frictional force is also large. Let us assume here that the laminated plate 20 is fastened to the base material 11 in the part E constituting loops of the vibration mode 1. In this case, the independent deformation of thin plates 21, 21' that make up the laminated plate 20 is impeded, so that the inter-layer frictional force is completely eliminated or is extremely small. Consequently, a vibration damping effect created by the laminated plate 20 is not obtained, or else only an extremely slight vibration damping effect is obtained. Accordingly, in the first embodiment, the part E that constitutes a loop of the vibration mode 1 is avoided, and the laminated plate 20 is fastened to the base material 11 in another part, i. e., in concrete terms, in the part G that constitutes a node of the vibration mode 1.

Meanwhile, when parts constituting nodes of the vibration mode 1 in the side plate 11 were checked, it was found that these parts were in the region G shown in FIG. 1. The line connecting the circular arc center C of the side plate 11 which has a substantially circular arc shape in one portion of the lower side (one side) and the point A where there is a transition from the substantially circular arc shape to another shape on the side where the bucket 10 is attached to the construction machine is designated as the line segment CA, the point where the line segment CA intersects with the laminated plate 20 is designated as B, and the line connecting the point B and the circular arc center C is designated as the line segment BC. The region G consists of the center point d of the line segment BC and the part D in the vicinity of the center point d, the center point f of the line segment CA and the part F in the vicinity of the center point f, and the region between the part D and part F.

Accordingly, when the laminated plate 20 is fastened to the side plate 11 of the bucket 10, the part D (for example) within the region G is fastened. FIG. 2 shows one example of the method used to fasten the part G of the laminated plate 20 to the side plate 11. As is shown in FIG. 2, a hole 50 is bored so that this hole passes through the protective plate 30 and laminated plate 20 so as to reach the side plate 11, and plug welding is performed so that the hole 50 is filled with a welding material 51. Furthermore, fastening may also be performed by arbitrary fastening means other than plug welding, such as bolt fastening or the like.

The part G forming a node of the vibration mode 1 is inherently a part where the amount of deformation of the thin plates 21, 21' forming the laminated plate 20 is small or almost non-existent. Accordingly, even if this part is fastened, the vibration damping effect that is lost is extremely small or almost non-existent. Consequently, the deleterious effect on the vibration damping effect caused by the fastening of the laminated plate 20 can be suppressed to a minimum. Thus, in the first embodiment, since the construction is devised so that the optimal part G in the interior part of the laminated plate 20 is fastened, there is no loss of the vibration damping effect due to thermal strain during manufacture or "floating" caused by external forces during use. Furthermore, the independent deformation of the thin plates 21 that make up the laminated plate 20 is not impeded, so that a high vibration damping effect can be maintained. Moreover, in the first embodiment, a part other than the loop for a single vibration mode with a single frequency is fastened; however, a part other than a loop for respective vibration modes at a plurality of frequencies may also be fastened.

FIGS. 5A through 5D respectively show the distributions of the size of the amplitude in cases where the side plate 11 was caused to vibrate in vibration modes 1, 2, 3 and 4 with different frequencies. When the side plate 11 was caused to vibrate in the vibration modes 1, 2, 3 and 4, the parts that were other than loops of the vibration nodes were in region G for all of the frequencies. As is shown in FIG. 1, this region G consists of the part D, part F and region between part D and part F. Accordingly, when the laminated plate 20 is fastened to the side plate 11 of the bucket 10, if the part D within the region G is fastened, the deleterious effect on the vibration damping effect caused by the fastening of the laminated plate 20 can be suppressed to a minimum.

Furthermore, in the first embodiment, the fastening parts in the interior parts when the laminated plate 20 is fastened to the side plate 11 are determined with the vibration mode being taken into account; however, the side plate 11 can also be fastened in parts other than the peripheral edges of the laminated plate 20. If this is done, the floating and the like generated by the application of heat can be prevented. In particular, it is desirable that both parts (in the interior parts) of the laminated plate 20 other than the peripheral edges, and the peripheral edge 20a of the laminated plate 20, be fastened to the side plate (or base material) 11. As a result, floating and the like can be more securely prevented, and a high vibration damping effect can be maintained.

In the first embodiment, the side plate 11 of the bucket 10 of a construction machine constitute the object of vibration damping; however, the present invention can be applied in cases where an arbitrary base material is taken as the object of vibration damping. Specifically, the present invention may also be applied in cases where booms or arms other than buckets among the members constituting the work equipment of a construction machine are subjected to vibration damping. Furthermore, in the case of construction machines equipped with plates, the present invention may also be used to damp the vibration of these plates. Furthermore, the present invention may also be applied to crushers or the like equipped with hoppers, and used to damp the vibration of such hoppers, which constitute sources of noise. Moreover, the present invention may also be applied in cases where tracks, track frames or the like constituting the running gear of construction machines are subjected to vibration damping.

Furthermore, vibration damping can also be performed by attaching laminated plate 20 to components such as engines, hydraulic pumps or the like. Especially in the case of hydraulic pumps, noise that is generated as a result of the transmission of the pulsating motion generated by the hydraulic pump to piping is a problem. The frequencies that are a problem in hydraulic pumps are the frequency of the pulsating motion of the pump and frequencies that are multiples of this pulsating motion frequency. Accordingly, as in the first embodiment, if the system is devised so that the distribution of the size of the amplitude is determined for respective vibration modes having the vibration frequency and frequencies that are multiples of this vibration frequency, parts other than the loops of the respective vibration modes are specified, and these parts are fastened, noise caused by the pulsating motion generated by the hydraulic pump can be reduced.

Figure 6:
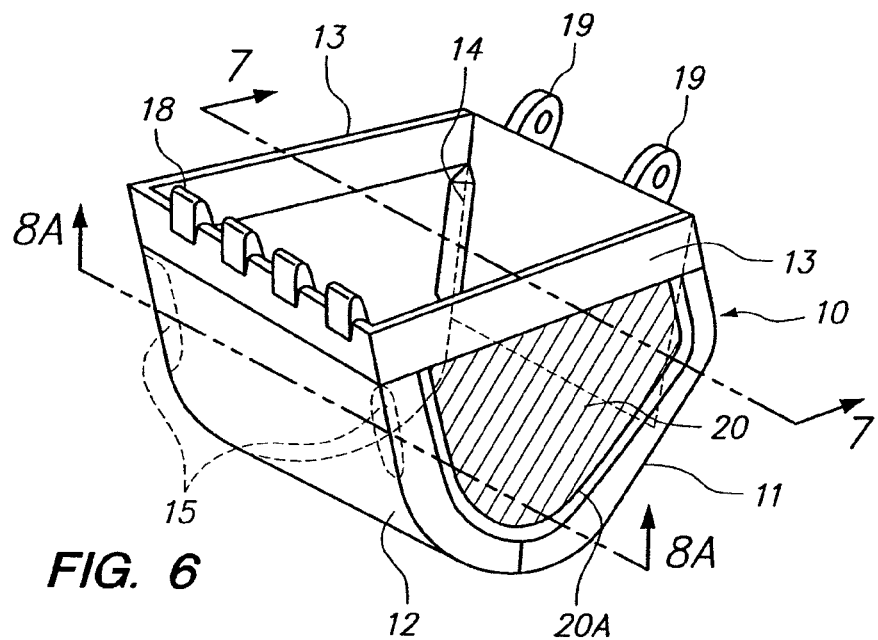
FIG. 6 is a perspective view of a bucket constituting a second embodiment of the present invention.
Figure 7:
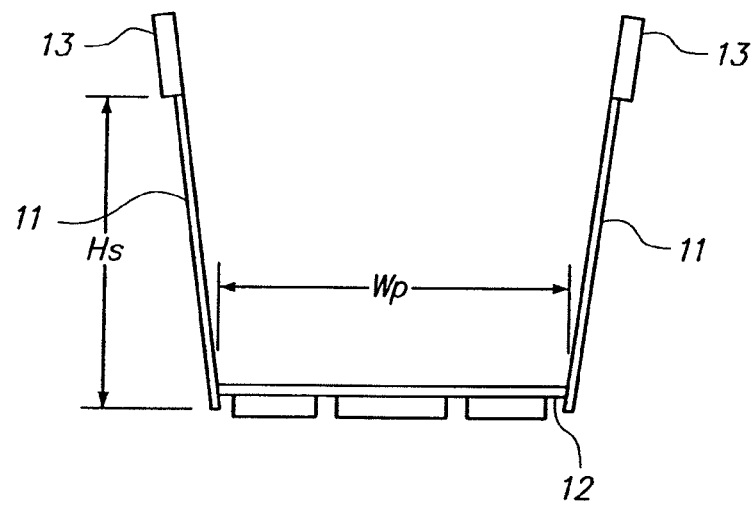
FIG. 7 is an explanatory diagram corresponding to a sectional view 7-7 in FIG. 6, showing dimensions of respective parts of the bucket.

Next, a case in which the vibration generated in the bucket of a construction machine is suppressed and noise emitted from the side plate and bottom plate is reduced will be described as a second embodiment. FIG. 6 is a perspective view of the bucket 10 that is the object of vibration damping in the second embodiment, and FIG. 7 shows a sectional view of the bucket 10. As is shown in FIG. 6, numerous thin steel plates are laminated to form laminated plate 20 on the side plate 11 of the bucket 10. The periphery 20a of the laminated plate 20 is fastened to the side plate 11 by all round fillet welding. Furthermore, in regard to the method used to fasten the laminated plate 20 to the side plate 11, besides a method in which the plates are fastened by all round fillet welding as described above, it would also be possible to fasten the plates by an arbitrary fastening method such as intermittent fillet welding, intermittent plug welding, bolt fastening or the like.

Edge plate 13 is attached to the upper ends of the side plate 11, so that the opening part of the bucket 10 is reinforced. A tooth 18 is attached to the bottom plate 12, and a bracket 19 is attached. An arm 41 (shown in FIG. 11A) is attached to the bracket 19. Reinforcing members 14 are attached to the corner parts where the side plate 11 and bottom plate 12 are connected on the inside of the bucket 10. The reinforcing members 14 are installed in order to maintain the strength of the bucket 10 and increase the rigidity.

Bridge form connecting members 15 which connect the side plate 11 and bottom plate 12 are attached to a specified part K (see FIG. 10) of the corner parts where the side plate 11 and bottom plate 12 are connected on the inside of the bucket 10. The connecting members 15 are installed in order to reduce the noise emitted from the bottom plate 12 while reinforcing the bottom plate 12 and maintaining the rigidity by connecting the side plate 11 and bottom plate 12.

Figure 9:
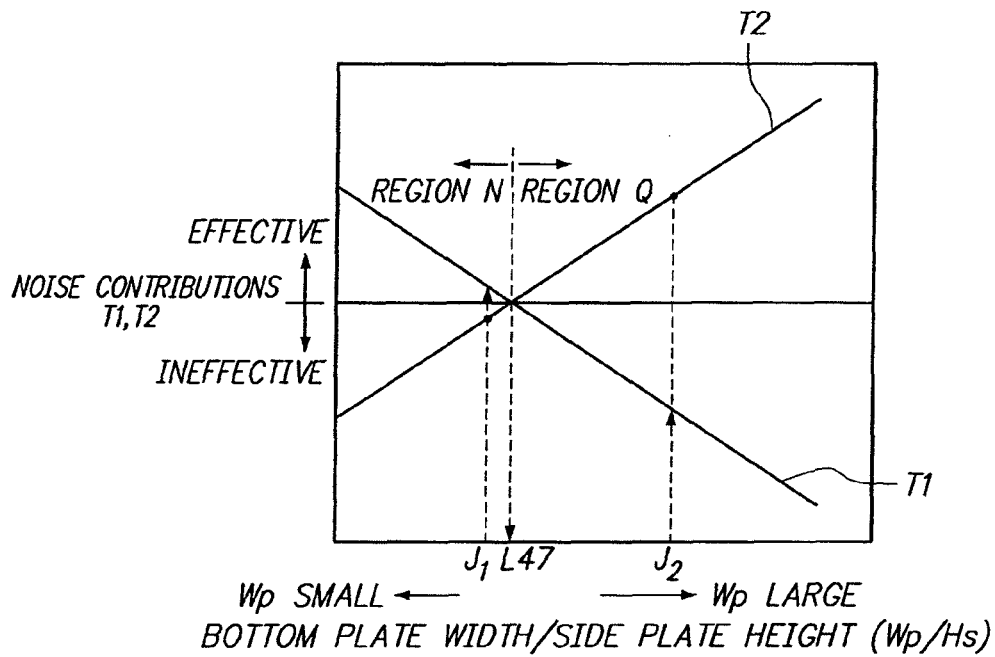
FIG. 9 is a diagram showing the relationship between the ratio of the width of the bottom plate to the height of the side plate and the contribution to noise in the second embodiment.

The standard for attaching connecting members 15 to the bottom plate 12 will be described. FIG. 9 shows the ratio Wp/Hs of the width Wp of the bottom plate 12 to the height Hs of the side plate 11 on the horizontal axis, and shows the respective noise contributions of the side plate 11 and bottom plate 12 on the vertical axis. FIG. 9 shows the results obtained when the noise contributions were measured in a state in which no laminated plate 20 or connecting member 15 was attached to the bucket 10. The width Wp of the bottom plate 12 of the bucket 10 and the height Hs of the side plate 11 are defined as shown in FIG. 7.

As is shown in FIG. 9, in the region N in which the ratio Wp/Hs is less than 1.47, the noise contribution T2 of the bottom plate 12 is smaller than the noise contribution T1 of the side plate 11. In other words, since the noise contribution T2 of the bottom plate 12 is smaller than the noise contribution T1 of the side plate 11, so that the noise emitted from the side plate 11 is the dominant factor, the noise emitted from the bucket 10 can be reduced merely by attaching laminated plate 20 to the side plate 11. Even if the bottom plate 12 is reinforced, this makes almost no contribution to a reduction in the noise of the bucket 10; consequently, there is no need to reinforce the bottom plate 12. Accordingly, in the case of buckets 10 in which the ratio Wp/Hs is less than 1.47, only laminated plate 20 is attached to the side plate 11, and the attachment of connecting members 15 is omitted.

Figure 8A:
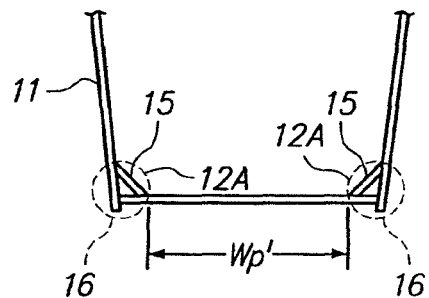
FIGS. 8A and 8B show the bucket with connecting members attached in the second embodiment, with FIG. 8A corresponding to a sectional view 8A-8A in FIG. 6, and FIG. 8B being a perspective view of the inside of the bucket.
Figure 8B:
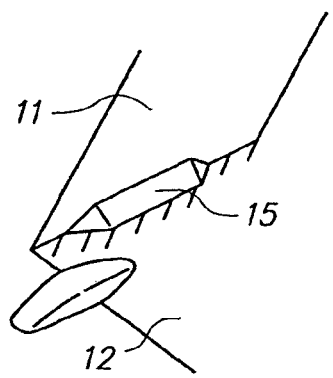

On the other hand, in the region Q in which the ratio Wp/Hs is 1.47 or greater, the noise contribution T2 of the bottom plate 12 is equal to or greater than the noise contribution T1 of the side plate 11. In other words, since the noise emitted from the bottom plate 12 is the dominant factor, the mere attachment of laminated plate 20 to the side plate 11 is insufficient, and the noise emitted from the bucket 10 cannot be reduced unless the noise emitted from the bottom plate 12 is reduced. Accordingly, in the case of buckets 10 in which the ratio Wp/Hs is 1.47 or greater, connecting members 15 are attached to the corner parts 16 where the side plate 11 and bottom plate 12 are connected (as shown in FIGS. 8A and 8B), in addition to the attachment of laminated plate 20 to the side plate 11.

Thus, in the second embodiment, the standard for the requirement of noise countermeasures with respect to the bottom plate 12 is clearly set as the "ratio Wp/Hs of the width Wp of the bottom plate to the height Hs of the side plate being 1.47 or greater", and the bottom plate 12 is reinforced according to this standard. As a result, noise countermeasures can be taken with the minimum required effort for the minimum required buckets (among various types of buckets), without performing noise experiments or the like. Accordingly, the cost of the design and manufacture of buckets can be greatly reduced. Furthermore, the question of whether or not the bottom plate 12 should be reinforced can be decided from the dimensions of respective parts in the design stage when buckets are newly designed, so that confirmation by noise experiments or the like is unnecessary. Accordingly, the process from design to manufacture can be shortened.

Next, the attachment positions and attachment method of the connecting members 15 will be described in terms of respective examples.

Example 1

Connecting members 15 are attached over the entire region of the corner parts 16.

Example 2

Figure 10:
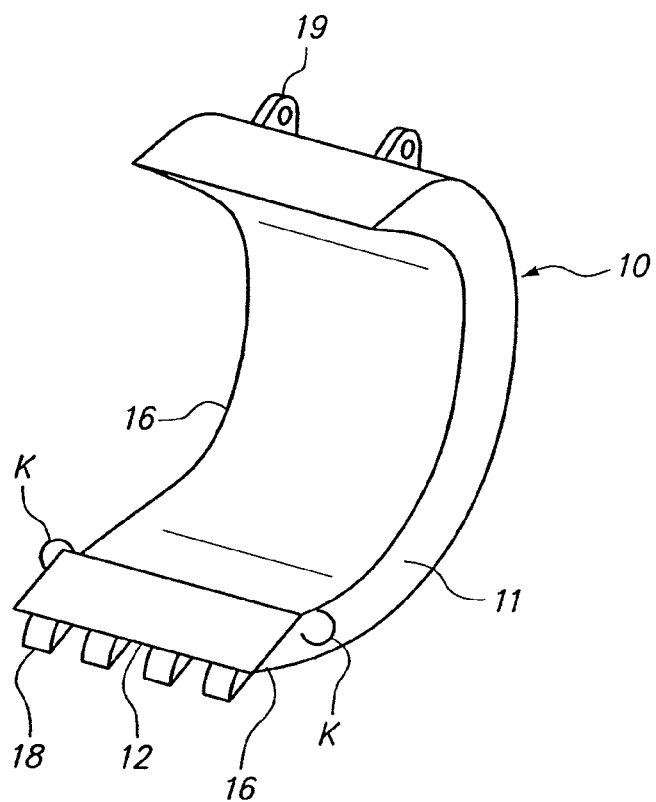
FIG. 10 is a distribution diagram of the size of the amplitude when the bucket is caused to vibrate in a vibration mode at a specified frequency in the second embodiment.

The main sources of the generation of the noise that is emitted from the bottom plate 12 are specified, and connecting members 15 are attached in these parts only. When the frequency spectrum of the noise occurring during actual work performed by the construction machine was analyzed, it was found that it is important to reduce noise in the frequency bands in which large peaks are generated. Accordingly, vibration modal analysis of the bucket 10 is performed at frequencies in the frequency bands in which large peaks are generated, and the main sources of the noise that is emitted from the bottom plate 12 are located. FIG. 10 shows a typical vibration mode amplitude distribution for the bucket 10; the respective parts are indicated by light or dark shades according to the size of the amplitude. Furthermore, in FIG. 10, the attachment positions of the tooth 18 and bracket 19 are indicated in order to clarify the correspondence with FIG. 6.

As is shown in FIG. 10, the size of the amplitude differs according to the part even if the structure is the same, so that there are parts where the amplitude is large, i. e., parts that form loops of the vibration mode, and parts where the amplitude is small, i. e., parts that form nodes of the vibration mode. It is conceivable that the parts that form loops of the vibration mode in the corner parts 16 might be the main sources of noise emitted from the bottom plate 12. Accordingly, the part K that forms the loop of the vibration mode in the corner parts 16 are found from the amplitude distribution shown in FIG. 10, and connecting members 15 are attached in the part K. In Example 2, the system is devised so that reinforcement is effected by attaching connecting members 15 only in the part K that forms the loop of the vibration mode in the corner parts 16 where the side plate 11 and bottom plate 12 are connected; accordingly, reinforcement of the bottom plate 12 is accomplished by the minimum necessary reinforcement, so that the deleterious effect on the performance of the construction machine can be kept to a minimum.

Example 3

Connecting members 15 are attached in a configuration in which the ratio Wp'/Hs of the substantial width Wp' of the bottom plate 12 to the height Hs of the side plate 11 is smaller than 1.47. As is shown in FIGS. 8A and 8B, connecting members 15 are respectively attached to both corner parts 16 of the bottom plate 12, and the length of a line segment that connects the connection parts 12a of the connecting members 15 is designated as the "substantial bottom plate width Wp'". Here, as is shown in FIG. 9, it is assumed that the value of the ratio Wp/Hs prior to the attachment of the connecting members 15 is J2, and that this is in the region Q where the noise contribution T2 of the bottom plate 12 is the dominant factor. Connecting members 15 are attached in the region Q so that the reduction of the noise emitted from the bottom plate 12 is most efficient in reducing the noise of the bucket 10.

If connecting members 15 are attached, the ratio Wp'/Hs can be altered from a value of J2 to a value of J1, so that a transition can be effected to the region N where the noise contribution T1 of the side plate 11 is the dominant factor. The region N is a region where noise emitted from the bottom plate 12 is not a problem, and noise emitted from the side plate 11 is a problem. The attachment of laminated plate 20 to the side plate 11 in the region N is most efficient in reducing the noise of the bucket 10.

Thus, in Example 3, the noise emitted from the bottom plate 12 can be reduced by attaching the connecting members 15 so that the ratio Wp'/Hs is less than 1.47. Since the noise emitted from the side plate 11 is reduced by attaching laminated plate 20 to the side plate 11 in a state in which the ratio Wp'/Hs is less than 1.47, the noise emitted from the bucket 10 can be most efficiently reduced to a maximal extent.

Example 4

Working that combines Example 2 and Example 3 is also possible. Specifically, part K that forms the loop of the vibration mode with the corner parts 16 are found from the amplitude distribution in FIG. 10, and connecting members 15 are attached in the part K in a configuration in which the ratio Wp'/Hs is less than 1.47.

Example 5

In the abovementioned Examples 1 through 4, the corner parts 16 of the bottom plate 12 are reinforced using bridge form connecting members 15. However, it is sufficient if the corner parts 16 are reinforced as indicated by the broken lines in FIG. 8A; it is not absolutely necessary to use bridge form connecting members 15. For example, working in which the corner parts 16 are filled with reinforcing members without leaving gaps is also possible. Furthermore, working in which a reinforcing material is bonded to the outside of the bucket 10 rather than the inside of the bucket 10 (in the same manner as in the case of conventional wear plate) is also possible.

Example 6

In the abovementioned Examples 1 through 5, a case in which buckets 10 in which the ratio Wp/Hs is 1.47 or greater are reinforced is envisioned. However, working in which reinforcing members such as connecting members 15 or the like are attached in parts where the side plate 11 and bottom plate 12 are connected on the inside of the bucket 10, i. e., on the opposite side from the surfaces to which the laminated plate 20 is attached, is also possible. In this case, the reinforcing members may be disposed over the entire region of the inside connection parts of the side plate 11 and bottom plate 12, or may be disposed in only some of the inside connection parts.

Figure 11A:
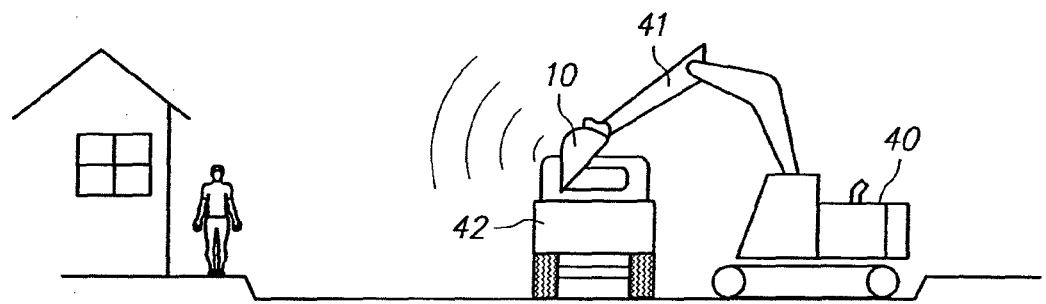
FIGS. 11A and 11B show how a hydraulic excavator equipped with a bucket performs loading work into a truck in an example of the second embodiment, with FIG. 11A being an explanatory side view, and FIG. 11B being an explanatory plan view.
Figure 11B:
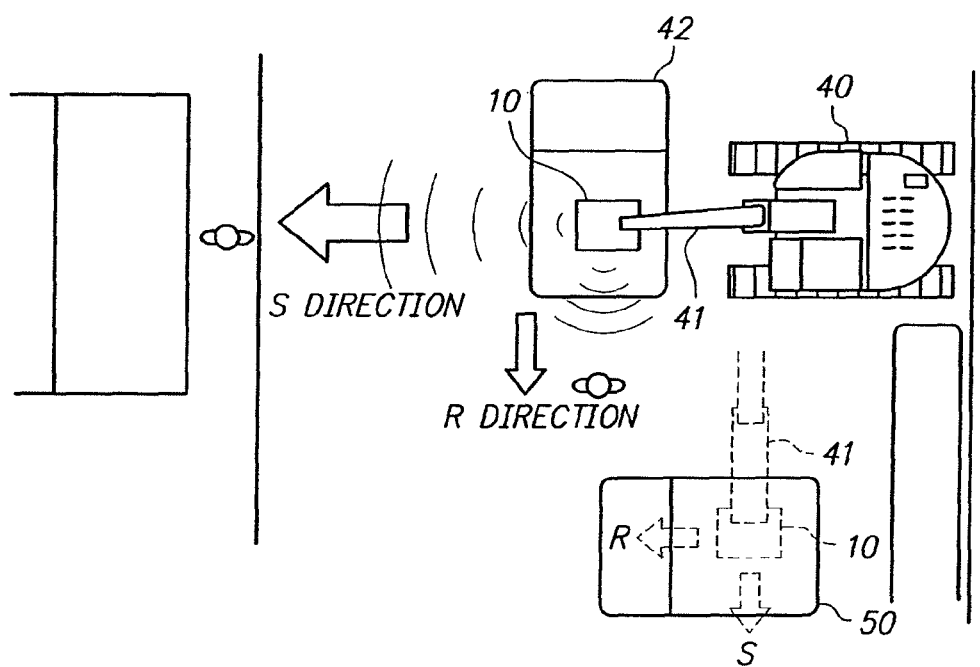

The effect of Example 6 will be described with reference to FIGS. 11A and 11B. FIGS. 11A and 11B show how a bucket 10 is attached to the arm 41 of a hydraulic excavator 40, and how this hydraulic excavator 40 performs loading work into a truck 42. Here, a case is envisioned in which laminated plate 20 is attached to the bucket 10, but the bottom plate 12 is not reinforced by means of connecting members 15 or the like. In this case, the noise emitted from the side plate 11 is conspicuously reduced by the laminated plate 20; however, the noise emitted from the bottom plate remains large. Accordingly, a sufficient noise reducing effect is not obtained with respect to noise from the front S of the bucket 10.

On the other hand, a case may be envisioned in which laminated plate 20 is attached to the bucket 10, and the bottom plate 12 is reinforced by connecting members 15 or the like. In this case, the amplitude of the vibration that is a cause of noise is reduced as a result of the bottom plate 12 being reinforced by connecting members 15 or the like, so that the noise that is emitted from the bottom plate 12 is reduced. Accordingly, a sufficient noise reducing effect is obtained with respect to noise from the front S of the bucket 10. Furthermore, the noise from the bottom plate 12 also has an effect on the noise from the sides R of the bucket 10. Accordingly, noise can be sufficiently reduced in all directions including the sides R of the bucket 10. Moreover, since only the inside connection parts of the bucket 10 are reinforced, the increase in the weight of the reinforcing material is small compared to a case in which reinforcing members such as wear plates are installed on the outside of the bucket 10.

Figure 12:
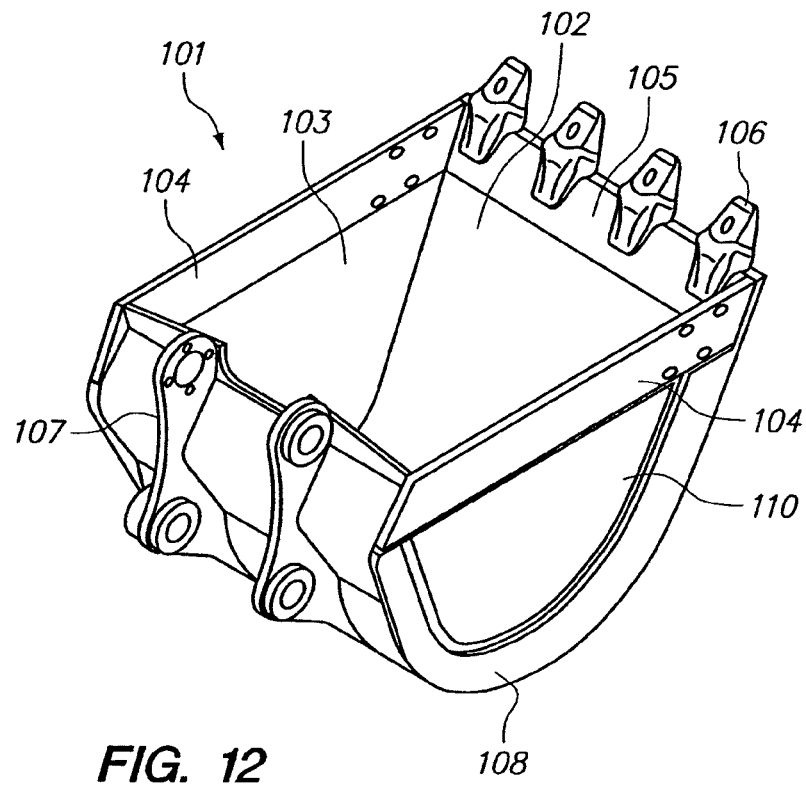
FIG. 12 is a perspective view of a bucket constituting a third embodiment of the present invention.

Next, a third embodiment will be described with reference to FIGS. 12 through 16C. As is shown in FIG. 12, in a bucket 101 which is a working attachment of a hydraulic excavator, side plates 103, 103 are respectively welded to the left and right sides of a bottom plate 102 which is bent into a substantial C shape. Furthermore, edge plates 104, 104 and 105 are respectively welded to the side plates 103, 103 and bottom plate 102, thus forming the opening part of the bucket 101. The edge plates 104, 104 and 105 are members that are mounted in parts that are subject to severe wear accompanying excavation work, and the thickness of these members is set at a thickness that is greater than that of the bottom plate 102 or side plate 103. A plurality of teeth 106 are mounted on the edge plate 105. Pin bosses 107 that connect with the work equipment of the hydraulic excavator are installed on the outer surface of the end part of the bottom plate 102 on the opposite side from the tooth attachment part. Wear plates 108 are disposed on the peripheral parts of the outside surfaces of the side plate 103 along the bottom plate 102.

Figure 13:
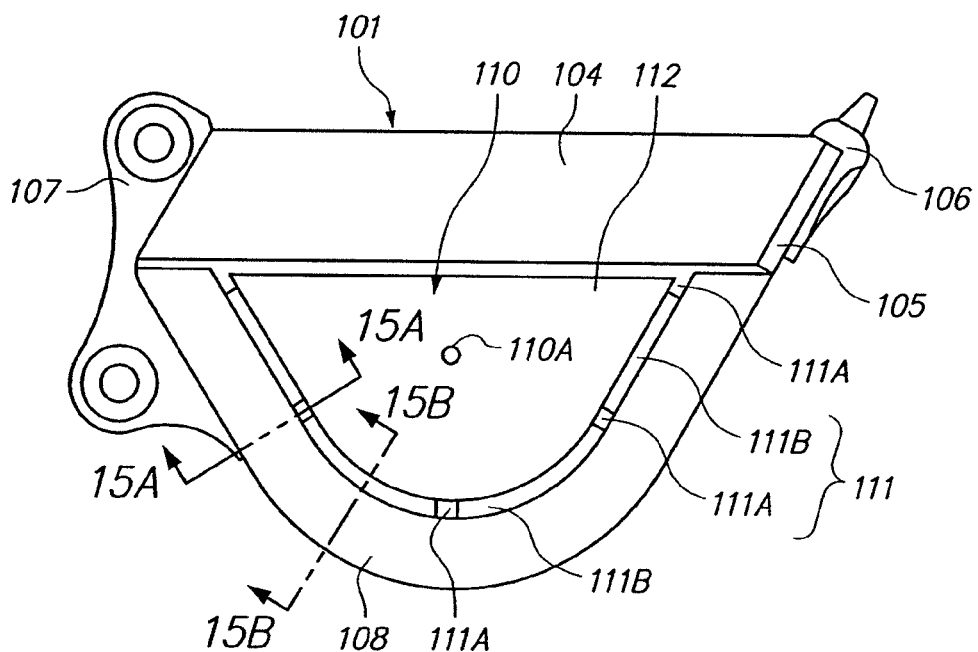
FIG. 13 is a side view of the bucket of the third embodiment.
Figure 14:
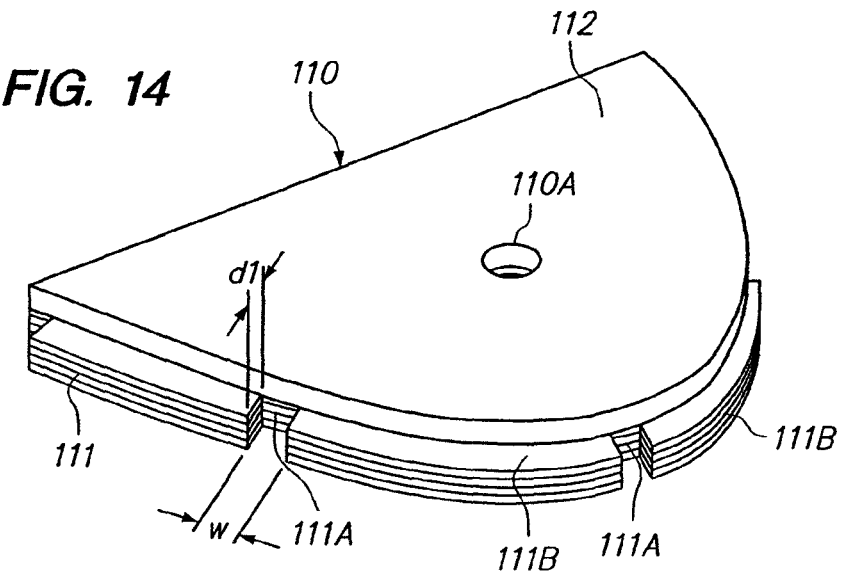
FIG. 14 is a perspective view of the laminated plate in the third embodiment.

As is also shown in FIG. 13, laminated plate 110 that has a substantially semicircular shape is bonded so that this plate is surrounded by the edge plate 104 and wear plate 108. Holes 110a used for plug welding are formed in the interior parts of the laminated plate 110. As is shown in FIG. 14, the laminated plate 110 comprises inner plates 111 consisting of a specified number of laminated thin steel plates, and an outer plate 112 which is laminated on the outside of the inner plates 111. The outer plate 112 retains the inner plates 111, and has a specified thickness that is used to protect the inner plates 111 from wear and collision with rocks during excavation work.

Figure 15A:
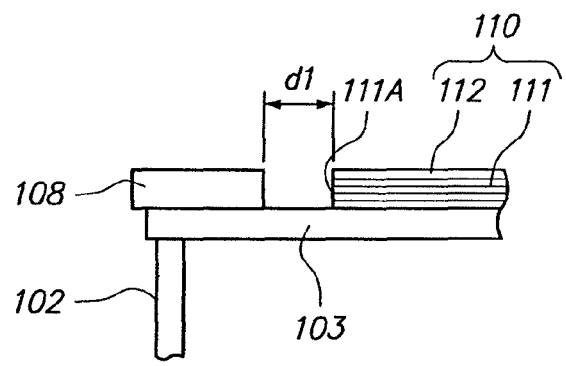
FIG. 15A is a sectional view of essential parts corresponding to the section 15A-15A in FIG. 13.
Figure 15B:
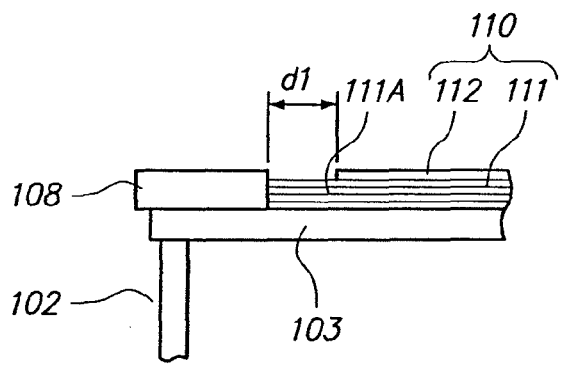
FIG. 15B is a sectional view of essential parts corresponding to the section 15B-15B in FIG. 13.
Figure 31:
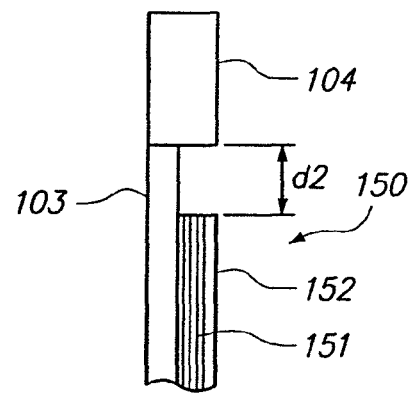
FIG. 31 is a sectional view along line 31-31 in FIG. 29 prior to welding.
Figure 32A:
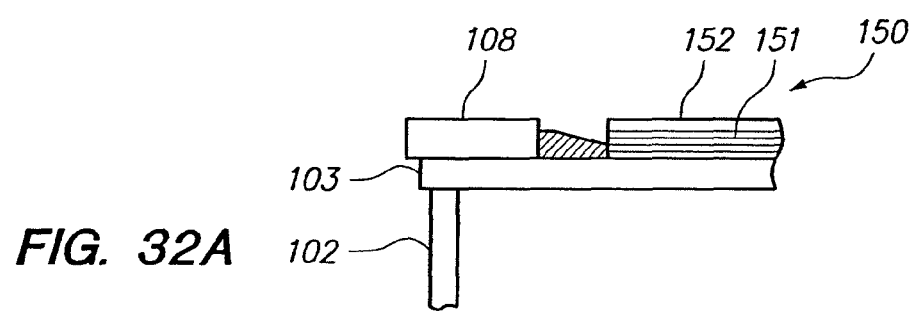
FIGS. 32A and 32B are sectional views of essential parts in FIG. 29 showing the welding process in the prior art, with FIG. 32A showing the state following the first pass of welding, and FIG. 32B showing the state following the second pass of welding.
Figure 32B:
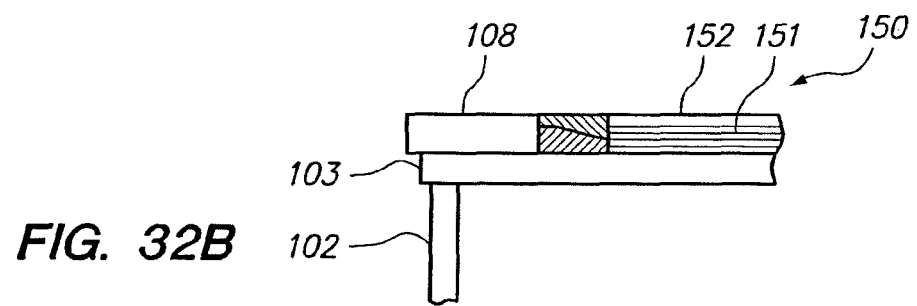
Figure 33:
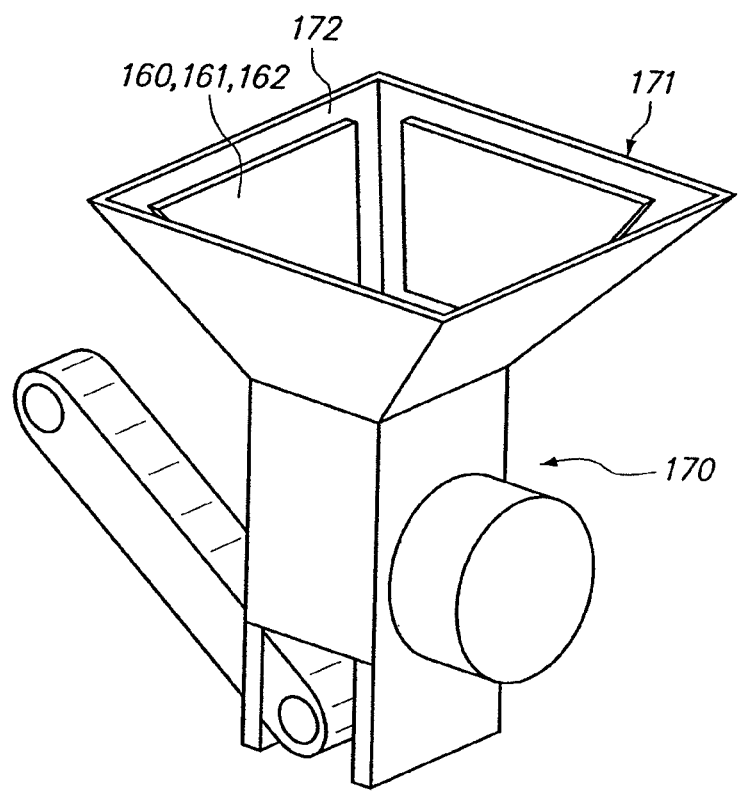
FIG. 33 is a perspective view of a crusher constituting prior art.

The shape of the end portions on the substantially circular arc form sides of the respective inner plates 111 is a shape that substantially matches the inner circumferences of the wear plates 108, and rectangular cut-out parts 111a with a specified width of w are formed in a plurality of locations including both ends (in the circumferential direction) of the end portions on the substantially circular arc form sides. A plurality of contact parts 111b which contact the inner circumferences of the wear plates 108 are formed by being demarcated by the cut-out parts 111a. The depth of the cut-out parts 111a is equal to the gap d1 between the outer plate 112 and the wear plate 108. The shape of the end portions on the substantially circular arc form sides of the outer plate 112 is a shape which is such that gaps d1 are formed as welding margins between these plates and the wear plates 108. Since the abovementioned shape is used, the laminated plate 110 is separated by the formation of gap d1 with the wear plates 108 in the cut-out parts 111a as shown in FIG. 15A. In the contact part 111b, as is shown in FIG. 15B, the inner plates 111 of the laminated plate 110 contact the wear plates 108, and the outer plate 112 are separated by the formation of gaps d1 with the wear plates 108. Specifically, the contact parts 111b protrude beyond the peripheral edges of the outer plate 112 by an amount equal to the gaps d1. The respective inner plates 111 and the outer plate 112 have shapes (substantially rectilinear shapes) which are such that gaps d2 (not shown in the figures, but similar to those shown in FIG. 31) are formed as welding margins between these plates and the edge plate 104.

Figure 16A:
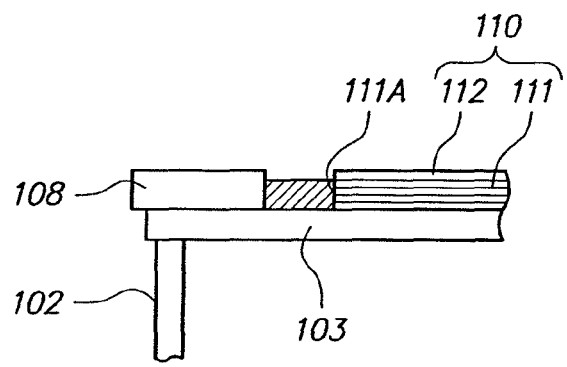
FIGS. 16A, 16B and 16C are sectional views of essential parts showing the welded state in the third embodiment, with FIG. 16A showing a case in which intermittent welding is performed in the gap shown in FIG. 15A, FIG. 16B showing a case in which continuous welding is performed in the gap shown in FIG. 15A, and FIG. 16C showing a case in which continuous welding is performed in the gap shown in FIG. 15B.
Figure 16B:
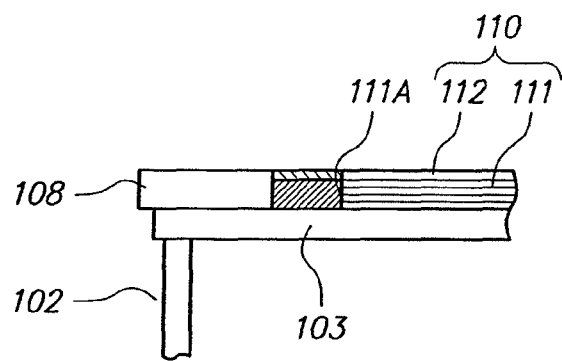
Figure 16C:
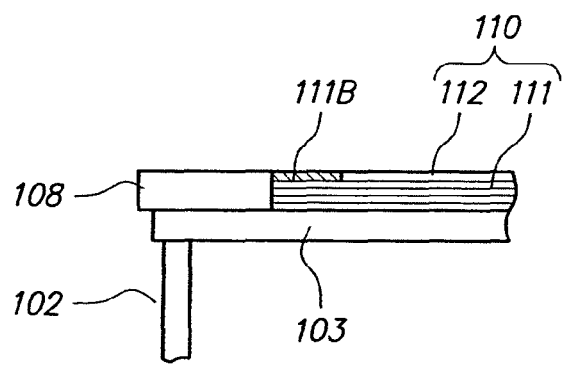

The process whereby the laminated plate 110 is bonded to the side surfaces of the bucket 101 is as follows. First, a specified number of inner plates 111 are superimposed, and these inner plates 111 are positioned by causing the contact parts 111b to contact the wear plates 108. Next, the positioning of the outer plate 112 is performed utilizing the cut-out parts 111a of the inner plates 111. After the positioning of the laminated plate 110 (inner plates 111 and outer plate 112) is completed, the cut-out parts 111a are attached and embedded by welding as shown in FIG. 16A. As a result, the respective inner plates 111 are attached to the bucket 101 by intermittent welding. Next, the gaps d1 between the cut-out parts 111a and contact parts 111b are embedded by continuous welding as shown in FIGS. 16B and 16C. Furthermore, the gaps d2 between the laminated plate 110 and edge plate 104 are embedded by continuous welding. Specifically, the laminated plate 110 is bonded to the side surfaces of the bucket 101 by the intermittent welding of the respective inner plates 111 on the side of the wear plates 108, and by the continuous welding of the outer plate 112. Preferably, furthermore, plug welding is performed in the holes 110a, so that floating of the respective plates of the laminated plate 110 caused by thermal strain or the like is prevented. As a result, the laminated plate 110 is bonded to the side plate 103 so that the side plate 103, inner plates 111 and outer plate 112 adhere to each other in a substantially tight manner.

Next, the operation of the abovementioned construction will be described. When the side plates 103 vibrate as a result of elastic deformation, this vibration is transmitted via the welded parts, so that the respective inner plates 111 also vibrate due to elastic deformation, and a sliding motion occurs between the side plates 103 and inner plates 111, and between the inner plates 111 and other inner plates 111, while microscopic positional deviations and gaps are generated due to the propagation delay and differences in rigidity. While the vibration continues, such microscopic positional deviations and gaps continually arise while constantly varying; accordingly, friction and collisions are repeated between these plates. Consequently, the vibrational energy of the side plates 103 is converted into thermal energy and dissipated by such friction and collisions. Accordingly, the vibration of the side plates 103 can be reduced, and the noise that is emitted from the side plates 103 can therefore also be reduced.

In other words, the respective plates vibrate in accordance with the constraint conditions, so that microscopic relative displacements occur between the plates; accordingly, friction and collisions occur between the plates. As a result of such friction and collisions, the vibrational energy is converted into thermal energy; accordingly, vibration that causes noise can be attenuated. In particular, if the plates adhere to each other with a high degree of adhesion, friction between plates becomes more prevalent than collisions caused by the generation of gaps between the plates, so that vibration can be attenuated with greater efficiency.

Next, the effect of the present embodiment will be described. In the present embodiment, the entry of rain water into the interior parts of the laminated plate 110 is prevented by the continuous welding of the outer plate 112 of the laminated plate 110, so that the occurrence of rusting between the plates is prevented, thus making it possible to maintain the vibration damping performance. Since the edge plate 104 and wear plate 108 protect these continuously welded parts from friction and collision with rocks or the like during excavation work, wear and damage of the welded parts of the laminated plate 110 can be prevented, so that the durability of the laminated plate 110 can be improved. Furthermore, since the welding is intermittent welding formed by the welding of the plurality of cut-out parts 111a of the inner plates 111, the degree of constraint is low compared to continuous welding such as all round welding or the like; accordingly, superior vibration damping characteristics are obtained, so that a vibration damping device with a conspicuous noise reducing effect can be obtained.

In regard to the effect from the standpoint of manufacture, the specified number of inner plates 111 can be positioned merely by causing the contact parts 111b to abut against the wear plates 108; there is no need to ensure a welding margin gap d1 with the wear plates 108. As a result, the outer plate 112 can also easily be positioned utilizing the cut-out parts 111a of the inner plates 111; accordingly, the positioning work is easy, so that a low-cost vibration damping device can be obtained. Since the welding with the wear plates 108 is completed by intermittent welding based on the welding of the cut-out parts 111a and the continuous welding of the outer peripheries of the outer plate 112, the amount of welding required is small, so that the welding process can be shortened, thus making it possible to obtain a low-cost vibration damping device. In conventional techniques, a large number of temporary attachments are performed in order to prevent the occurrence of thermal strain. In the present invention, however, since the welding of the cut-out parts 111a also serves as a temporary attachment, the temporary attachment process can be omitted, and since there is also little continuous welding, the welded locations of the cut-out parts 111a that also serve as temporary attachments show at least little generation of thermal strain.

Here, the results of a test confirming the relationship between the noise reducing effect and the welding pitch of the inner plates 111 will be described. Basically, the noise reducing effect of a vibration damping device using laminated plate increases as the number of points constraining the laminated plate is reduced, i. e., as the length of the welded parts becomes shorter. As will also be understood from the previous description of the operation, the reason for this is that relative displacement between the layers is facilitated, so that a larger frictional force is generated. Accordingly, it would appear that a larger welding pitch of the inner plates 111 is desirable. However, if the welding pitch is excessively large, the conflicting problem of the generation of a knocking sound due to knocking between the inner plates caused by local vibration of the peripheral edges of the inner plates arises.

Accordingly, the relationship between the welding pitch of the inner plates and the generated noise level was measured. FIG. 17 shows the measurement results. According to FIG. 17, the noise level gradually drops as the welding pitch increases, with the generated noise showing a minimum value at a pitch of approximately 170 mm. It is seen that as the pitch increases beyond this value, the noise gradually increases as a result of the abovementioned knocking sound, converging at a substantially constant level at a pitch of approximately 280 mm This convergent level is substantially equal to the noise level at a pitch of 100 mm. Accordingly, if the pitch is set at a value smaller than 100 mm, the effect drops compared to a case where the pitch is greater than 170 mm so that a knocking sound is generated. Furthermore, even in cases where it is desired to increase the welding pitch from the standpoint of cost reduction, if the pitch is increased to a value exceeding 280 mm, the noise reduction effect drops as a result of the knocking sound. As a result of the above, it is desirable to set the welding pitch of the inner plates at a value between 100 mm and 280 mm.

Figure 18:
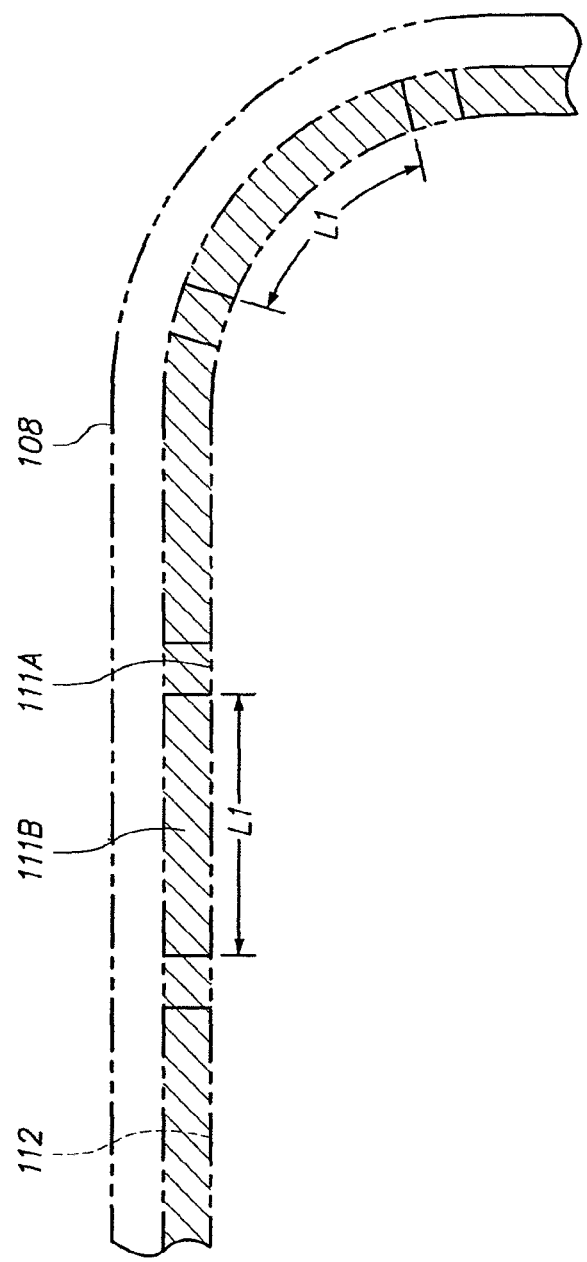
FIG. 18 is an explanatory diagram of the welding pitch in the third embodiment.

Accordingly, it is desirable to set the welding pitch of the inner plates 111 in the third embodiment, i. e., the length L1 of the contact parts 111b in the circumferential direction, at a value between 100 mm and 280 mm. The length L1 of the contact parts 111b in the circumferential direction is defined as shown in FIG. 18.

Figure 19A:
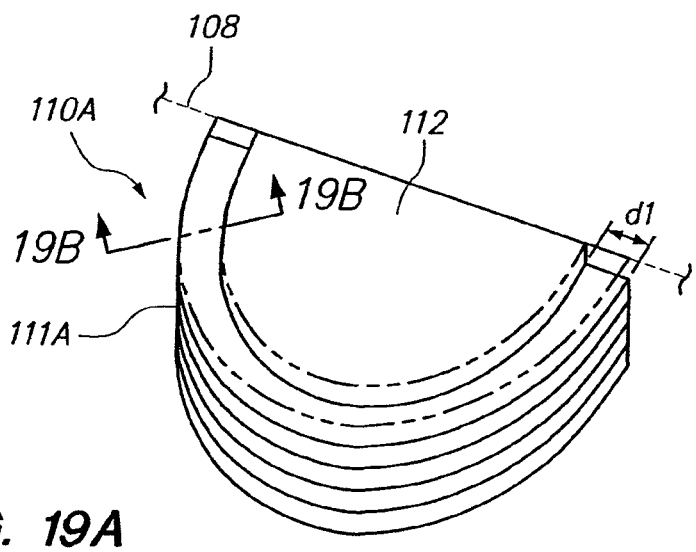
FIG. 19A is another example of the third embodiment.
Figure 19B:
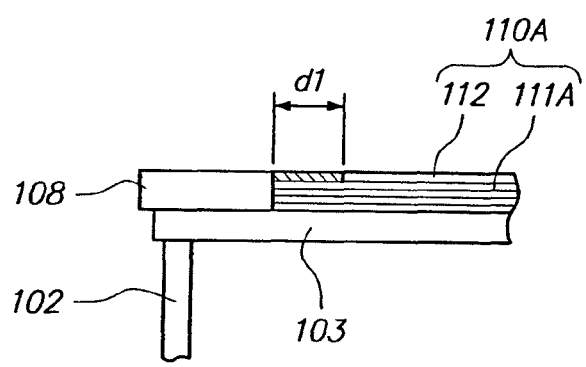
FIG. 19B is a sectional view along line 19B-19B in FIG. 19A.

In the third embodiment, a construction is used in which the peripheral edge portions of the inner plates 111 are intermittently welded by welding cut-out parts 111a disposed at specified intervals in the peripheral edges of the inner plates 111 to the side plate 103. However, the present invention is not limited to this; for instance, it would also be possible to use other examples of laminated plate constructions as shown in FIGS. 19A and 19B. Here, FIG. 19A is a perspective view of another example of a laminated plate, and FIG. 19B is a sectional view along line 19B-19B.

In FIGS. 19A and 19B, the construction has outer peripheral end parts with a substantially semicircular shape that is substantially equivalent to the inner circumferential shape of the wear plate 108 of the bucket 101, and a plurality of inner plates 111A which do not have cut-out parts formed in the peripheral edges are laminated. An outer plate 112 which has a diameter that is smaller than the diameter of the inner plates 111A by a specified dimension d1 is laminated on the outside of this plurality of laminated parts, thus forming a laminated plate 110A. The laminated plate 110A is bonded to the outside surface of the side plate 103 of the bucket 101, so that the laminated plate 110A is surrounded by the edge plate 104 and wear plate 108. Only the outer plate 112 and the peripheral edges of the outermost inner plate 111A are constrained by continuously welding the peripheral edges of the outer plate 112, the wear plate 108 and the edge plate 104. In this case as well, not all of the plates are constrained; accordingly, the degree of constraint is low, so that superior vibration damping characteristics can be obtained. Furthermore, the entry of rain water into the interior parts of the laminated plate is prevented, so that the occurrence of rusting between the plates is prevented, thus making it possible to maintain the vibration damping characteristics over a long period of time.

Figure 20:
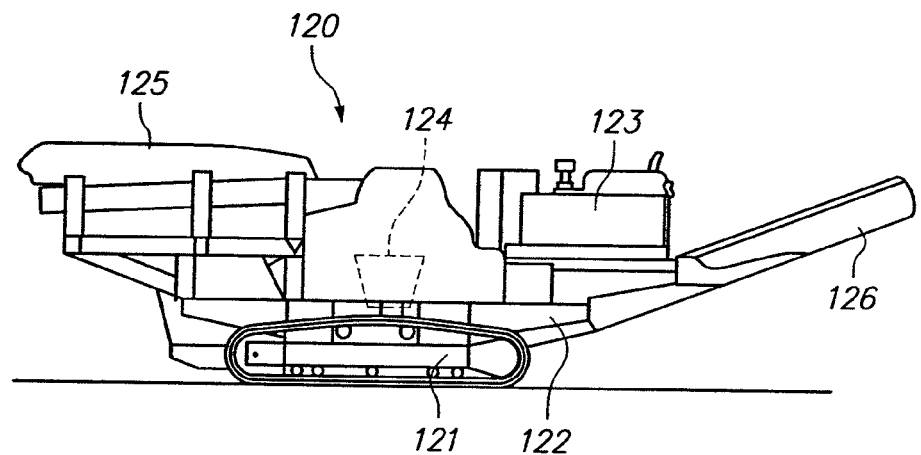
FIG. 20 is a side view of a mobile crusher constituting a fourth embodiment of the present invention.

Next, a fourth embodiment will be described with reference to FIGS. 20 through 23B. The fourth embodiment is an embodiment in which laminated plate is applied to the hopper of a mobile crusher. In this mobile crusher 120, as is shown in FIG. 20, a motive force device 123 is mounted on the rear part of a base 122 equipped with a track type propulsion device 121, a crusher is mounted on the central part of the base 122. Matter constituting the object of crushing which is placed into a hopper 125 disposed on the front part of the base 122 (e. g., rocks, concrete debris, wood, construction waste or the like) is crushed to a specified size by the crusher 124, and is fed out to the rear by a feed-out device which extends to the rear from the lower part of the base 122.

Figure 21:
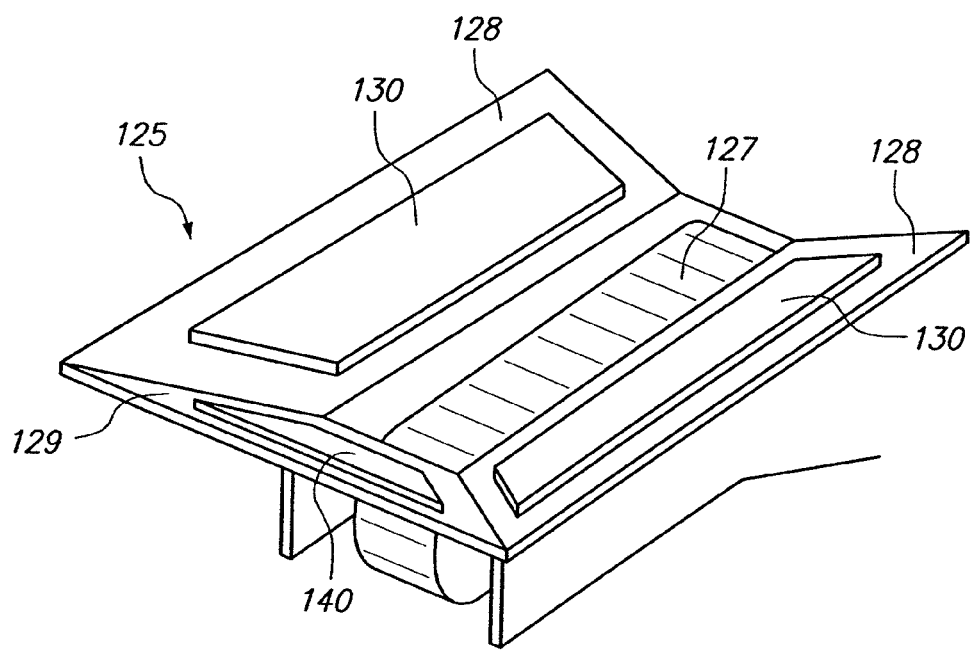
FIG. 21 is a perspective view of the hopper in the fourth embodiment.

As is shown in FIG. 21, a feeder 127 that conveys the inserted matter constituting the object of crushing to the crusher 124 is disposed in the central part of the hopper 125, and inclined wall surfaces 128, 128 and 129 of the hopper 125 form an upward-oriented opening part so as to surround the feeder 127. Laminated plates 130, 130 and 140 are respectively bonded to the inclined wall surfaces 128, 128 and 129 of the hopper 125. The laminated plate 130, 130 and 140 have different shapes but similar structures; accordingly, one of the laminated plate 130 will be described below as an example.

Figure 22:
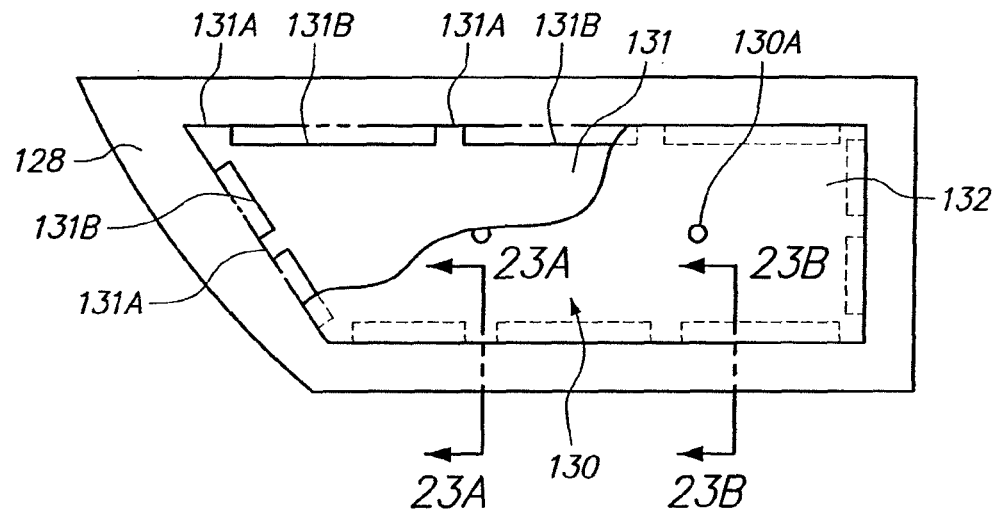
FIG. 22 is a plan view of the inclined walls in the fourth embodiment.

As is shown in FIG. 22, this laminated plate 130 has an external shape that is smaller than that of the inclined wall surface 128 all the way around, and is bonded to the central part of the inclined wall surface 128. Holes 130a used for plug welding are formed in specified parts of the laminated plate 130. The laminated plate 130 comprises inner plates 131 consisting of a specified number of thin steel plates that are laminated, and an outer plate 132 that is laminated on the outside of the inner plates 131. The outer plate 132 retains the inner plates 131, and has a specified thickness that acts to protect the inner plates 131 from wear and collisions with the matter constituting the object of crushing at the time of insertion of this matter constituting the object of crushing. The external shape of the outer plate 132 constitutes the external shape of the laminated plate 130, and comprises a plurality of protruding parts 131a on the peripheral edges of the inner plates 131 that match the peripheral edge shape of the outer plate 132, and a plurality of cut-out parts 131b that are indented with respect to the peripheral edge shape of the outer plate 132.

Figure 23A:
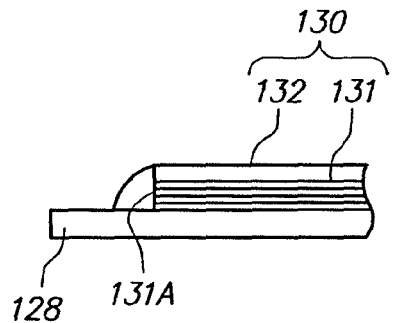
FIG. 23A is a sectional view along line 23A-23A in FIG. 22.
Figure 23B:
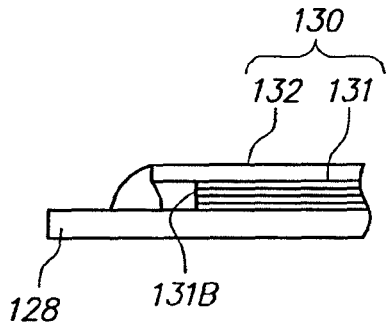
FIG. 23B is a sectional view along line 23B-23B in FIG. 22.

The process whereby the laminated plate 130 is bonded to the inclined wall surface 128 of the hopper 125 is as follows. First, on a work bench (not shown in the figures) on which a jig (not shown in the figures) that contacts two adjacent sides of the laminated plate 130 is set, a specified number of inner plates 131 are superimposed, and an outer plate 132 is superimposed on top of these plates; then, positioning is performed by causing all of the plates to contact the jig, and temporary welding is performed in several locations on the peripheral edges. Next, the temporarily welded laminated plate 130 is disposed in a specified part on the inclined wall surface 128, and the laminated plate 130 is connected to the inclined wall surface 128 by continuous welding (all round welding). As a result, while the outer plate 132 is continuously welded, the respective inner plates 131 are subjected to intermittent welding in which these inner plates 131 are not welded in the cut-out parts 131b, and are welded to the inclined wall surface 128 only in the plurality of protruding parts 131a, as shown in FIGS. 23A and 23B.

Figure 24:
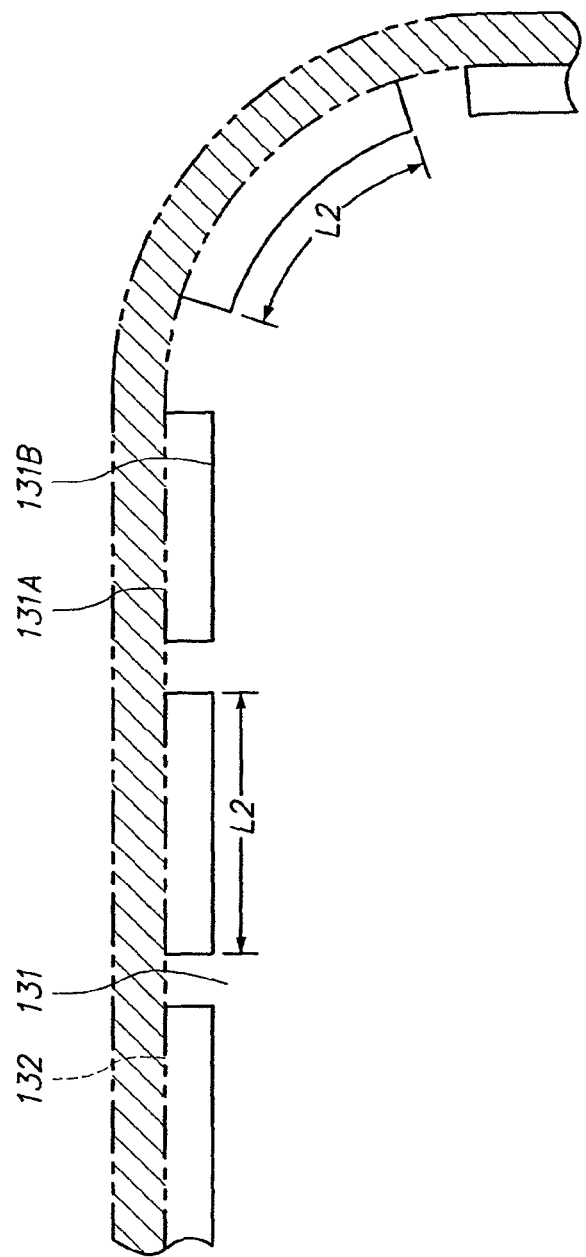
FIG. 24 is an explanatory diagram of the welding pitch in the fourth embodiment.

According to the measurement data shown in FIG. 17, it is desirable to set the spacing between the protruding parts 131a of the inner plates 131 in the fourth embodiment, i. e., the length L2 of the cut-out parts 131b in the circumferential direction, in the range of 100 mm to 280 mm. The length L2 of the cut-out parts 131b in the circumferential direction is defined as shown in FIG. 24.

Since the action of noise reduction by means of the laminated plate 130 is similar to that in the third embodiment, a description of this action will be omitted here. Next, the effect of the fourth embodiment will be described. In the present embodiment, the entry of rain water into the interior parts of the laminated plate 130 is prevented by the continuous welding of the outer plate 132 of the laminated plate 130, so that the occurrence of rusting between the plates can be prevented, thus making it possible to maintain the vibration damping performance. Since the inner plates 131 are intermittently welded so that the degree of constraint is lower than in the case of continuous welding (all round welding), superior vibration damping characteristics are obtained, so that a vibration damping device which has a conspicuous noise reducing effect is obtained. In regard to the effect from the standpoint of manufacture, since intermediate welding can be accomplished by welding the protruding parts 131a of the inner plates 131 by a continuous welding process performed on the outer plate 132, the manufacturing process can be simplified and the cost can be reduced. Furthermore, since the protruding parts 131a of the specified number of inner plates 131 match the external shape of the outer plate 132, the positioning of the respective inner plates 131 and the outer plate 132 is facilitated, so that a low-cost vibration damping device can be obtained.

Furthermore, the present invention is not limited to the third and fourth embodiments; alterations and modifications may be performed within the scope of the present invention. For instance, an example in which the inner plates 111 were constrained by intermittent welding in five places on the side of the wear plate 108 (i. e., the cut-out parts 111a) was described; however, such constraints may be appropriately selected in accordance with the required strength and the frequency band of the noise for which a reduction is desired.

Figure 25A:
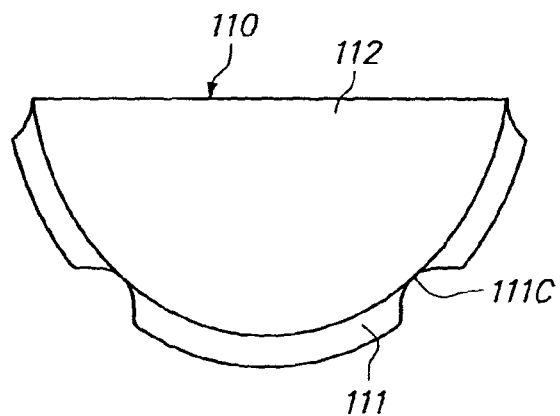
FIGS. 25A through 28 are plan views of other aspects of the laminated plate constituting modifications of the third and fourth embodiments, with FIG. 25A showing an example in which the cut-out parts have a wave shape, FIG. 25B showing an example in which a plurality of holes used for plug welding are formed in the peripheral edges of the inner plates, FIG. 25C showing an example in which a plurality of holes for welding to the side plate are formed in the inner plates and outer plate, FIG. 26 showing an example in which end parts of the inner plates on the edge plate side are caused to protrude beyond the peripheral edges of the outer plate, and cut-out parts are formed in the protruding parts, FIG. 27 showing an example in which a plurality of protruding parts and cut-out parts are formed in the end parts of the inner plates on the edge plate side, and FIG. 28 showing an example in which the end parts of the inner plates are caused to protrude beyond the peripheral edges of the outer plate, and a plurality of cut-out parts are formed in the protruding parts and embedded by welding.

An example was described in which rectangular cut-out parts 111a were formed in the inner plates; however, the shape of the cut-out parts is not limited to rectangular; wave-form cut-out parts 111c may also be formed as shown in FIG. 25A. Similarly, the cut-out parts 131b in the inner plates 131 of the fourth embodiment may also be formed as wave-form cut-out parts. In cases where the inner plates 111 are manufactured by means of a turret punching press or the like, gaps are generated between the respective inner plates 111 by the changes that occur in the end parts, so that the vibration damping performance drops; ordinarily, therefore, the inner plates 111 are manufactured by laser working. Accordingly, manufacture is not impeded even if the cut-out shape is a wave-form shape; furthermore, in cases where a large number of sites of intermediate welding are required as a result of strength requirements, a wave-form shape makes it possible to shorten the laser-cut length to a greater extent than a rectangular shape does, so that the productivity is improved.

Figure 25B:
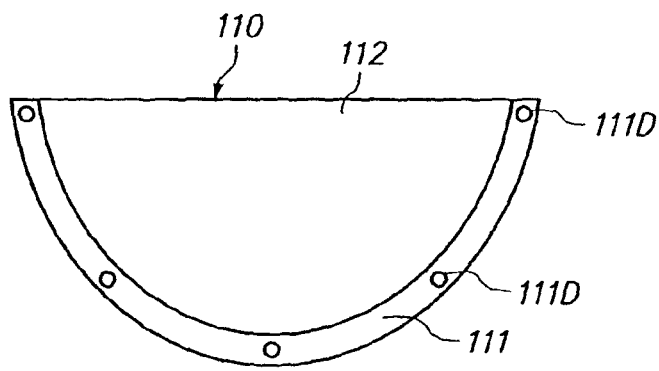
Figure 25C:
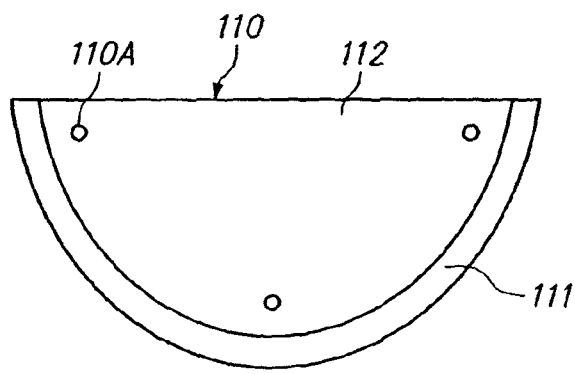
Figure 26:
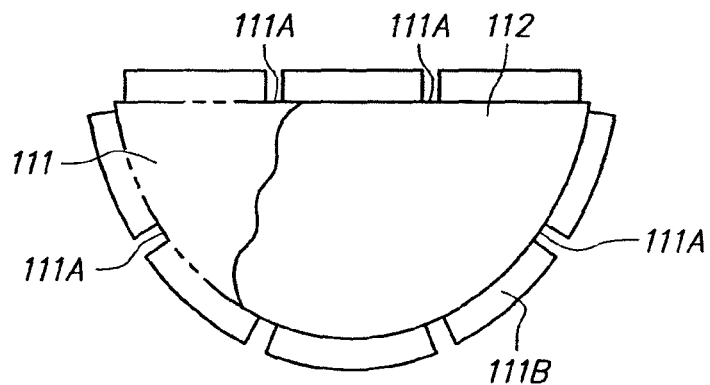

Instead of forming rectangular cut-out parts 111a in the inner plates 111, it would also be possible to construct the device so that holes 111d used for plug welding are formed in the peripheral edges of the inner plates 111 on the side of the wear-resistant parts 108, and the respective inner plates 111 are constrained to the side plate 103 by plug welding as shown in FIG. 25B. The peripheral edges of the inner plates 111 are intermittently welded by the plug welding performed in the holes 111d. The construction may also be devised so that constraint locations are not provided on the inner plates 111 alone, but a plurality of holes 110a used for plug welding that welds the inner plates 111 to the side plate together with the outer plate 112 are instead provided as shown in FIG. 25C. The inner plates 111 and outer plate 112 are intermittently welded by the plug welding performed in the holes 110a, so that an effect similar to that of the abovementioned embodiments is obtained.

In the laminated plate 110, an example is shown in which continuous welding is performed in the gaps d2 between the laminated plate 110 and the edge plate 104; however, in these parts as well, it would also be possible to constrain the parts by intermittent welding of the inner plates 111. Specifically, a construction can be used in which the end parts of the inner plates 111 on the side of the edge plate 104 are caused to protrude beyond the peripheral edges of the outer plate 112, cut-out parts 111a are formed in these protruding parts, and intermittent welding is accomplished by means of welding that embeds the cut-out parts 111a. If this is used, the number of locations where the inner plates 111 are constrained is reduced; accordingly, a vibration damping device with an even more superior vibration damping performance can be obtained.

Figure 27:
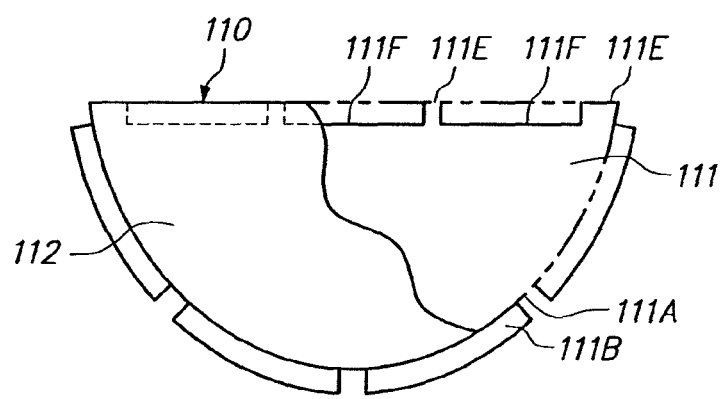

The technique of the fourth embodiment can also be added to the third embodiment. Specifically, as is shown in FIG. 27, a plurality of protruding parts 111e that match the external shape of the outer plate 112, and a plurality of cut-out parts 111f that are indented with respect to the external shape of the outer plate 112, are formed in the end parts of the inner plates 111 on the side of the edge plate 104. As a result, even if continuous welding is performed on the end parts of the laminated plate 110 on the side of the edge plate 104, this results in intermittent welding of the inner plates 111 in which only the protruding parts 111e are welded. As a result, the number of locations where the inner plates 111 are constrained is reduced, so that a vibration damping device with an even more superior vibration damping performance can be obtained.

Figure 28:
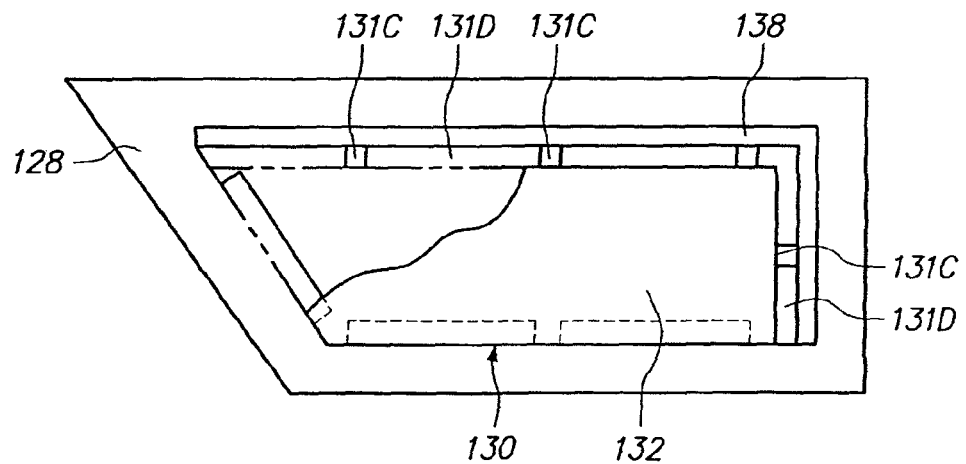
Figure 29:
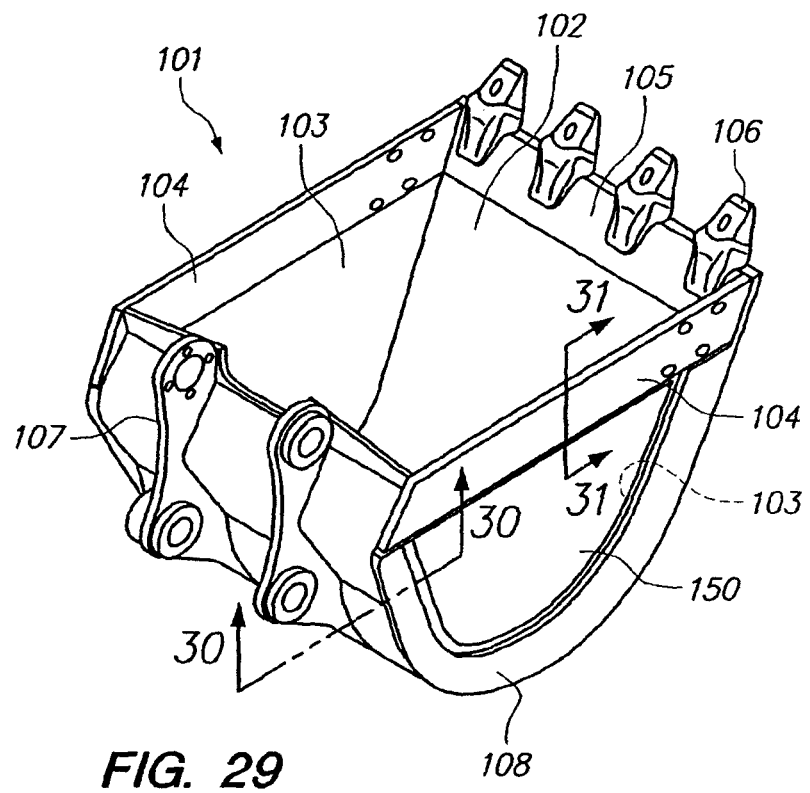
FIG. 29 is a perspective view of a bucket constituting prior art.
Figure 30:
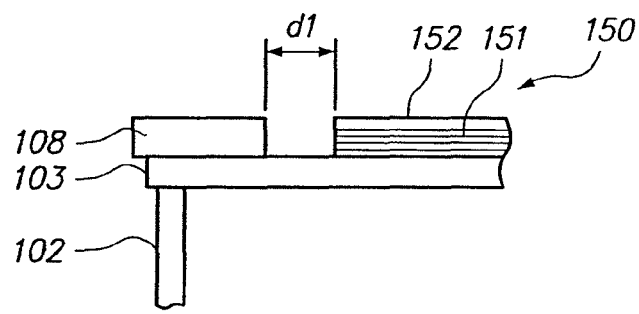
FIG. 30 is a sectional view along line 30-30 in FIG. 29 prior to welding.

Furthermore, the technique of the third embodiment can also be added to the fourth embodiment. Specifically, as is shown in FIG. 28, substantially L-shaped wear plate 138 that can contact two adjacent sides of the laminated plate 130 are attached to the inclined wall surfaces 128, the end parts of the inner plates 131 facing the wear plate 138 are caused to protrude beyond the peripheral edges of the outer plate 132 so as to contact the wear plate 138, and a plurality of cut-out parts 131c are formed in these protruding parts. A plurality of contact parts 131d that contact the wear plate 138 as a result of being demarcated by the cut-out parts 131c are formed on the protruding parts. After intermittent welding is accomplished by embedding this plurality of cut-out parts 131c by welding, the outer plate 132 are continuously welded so that the laminated plate 130 is bonded to the inclined wall surfaces 128. As a result, the respective inner plates 131 can be positioned on the inclined wall surfaces 128 by causing these plates to abut against the wear plate 138. Since the wear plate 138 protects the welded parts on the side of the wear plate 138 from wear or collision with the inserted matter that is the object of crushing, wear and damage of the welded parts of the laminated plate 130 can be prevented, so that the durability of the laminated plate 130 can be improved.

In the abovementioned third and fourth embodiments, a description was presented using a construction example in which the thickness of the laminated plate 110, 130, i. e., the total laminated height of the inner plates and outer plates, was set at substantially the same height as the height of the wear plates 108, 138. However, it is desirable to set the total laminated height at a height that is equal to or less than the height of the wear plates 108, 138; in such a case, wear or damage of the welded parts of the laminated plate can be more securely prevented by the wear plates. The bucket 101 of a hydraulic excavator (including respective constituent members such as the side plate 3 or the like) and the hopper 125 of a mobile crusher (including respective constituent members such as the inclined wall surfaces 128 or the like) were cited as examples of machine members to which the laminated plate was bonded. However, the laminated plate can be applied to arbitrary machine members for which a reduction in noise is desired, and it goes without saying that such laminated plate can also be applied to buckets of wheel loaders or hoppers of fixed crushing equipment. As was described above, invasion by rain water can be prevented by continuously welding the outer plate of the laminated plate so that the occurrence of rusting between plates can be prevented, and the degree of constraint of the inner plates of the laminated plate can be kept low by intermittently welding these inner plates; accordingly, superior vibration damping characteristics can be obtained so that a vibration damping device that has a conspicuous noise reducing effect can be obtained.

Figures 34, 35:
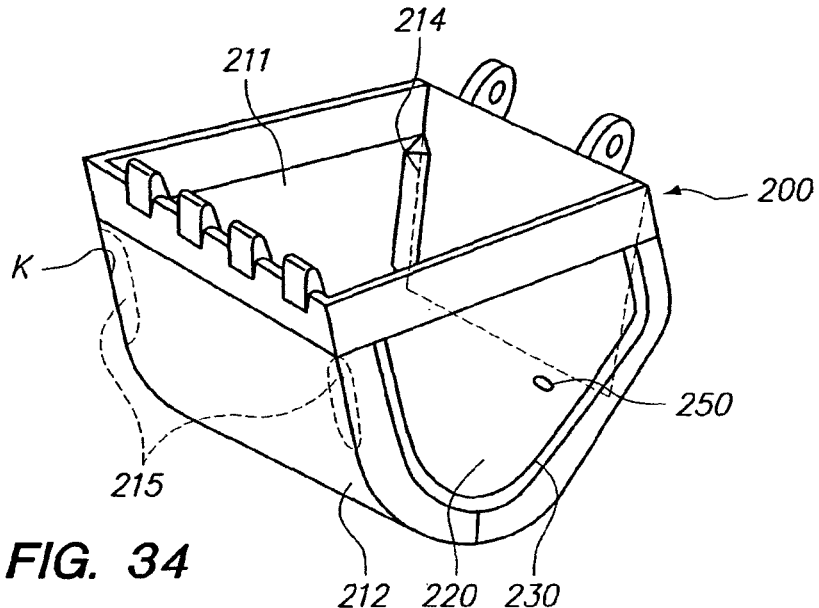
FIG. 34 is a perspective view of a bucket in an example combining the third and fourth embodiments.
FIG. 35 is a table showing the noise energy reduction rate of buckets in embodiments and examples of the present invention.

An example in which the first embodiment and second embodiment are combined is also possible. Specifically, as is shown in FIG. 34, the bucket 200 is devised in the same manner as in the first embodiment so that laminated plate 220 is attached to the side plate 211 by all round fillet welding 230, and the interior parts of the laminated plate 220 and the side plate 211 are welded by plug welding 250 in parts corresponding to the part D shown in FIG. 1 (optimization of plug welding). Furthermore, in the bucket 200, bridge form connecting members 215 that connect the side plate 211 and bottom plate 212 are attached in specified part K (see FIG. 10) among the corner parts where the side plate 211 and bottom plate 212 are connected (in the same manner as in the second embodiment). The relationship between the width Wp of the bottom plate 212 and the height Hs of the side plate 211 in this embodiment is in the region Q shown in FIG. 9 (i. e., the ratio Wp/Hs is 1.47 or greater). Moreover, in FIG. 34, reinforcing members 214 are fastened to the corner parts where the side plate 211 and bottom plate 212 are connected; however, the use of reinforcing members 214 may be omitted.

The noise energy reduction rate obtained using such a combination example will be described with reference to FIG. 35. Here, the noise energy reduction rate Ed is determined by experimentally measuring the noise energy generated before and after the attachment of laminated plate 220 and/or connecting members 215, and calculating this noise energy reduction rate as Ed=[(noise energy E1 generated prior to attachment−noise energy E2 generated after attachment)/E1]×100(%). The side plate contribution and the bottom plate contribution indicate the rates in the reduction of the noise respectively emitted from the side plate and bottom plate. "OVERALL" in FIG. 35 indicates the value obtained by totaling the respective reduction rates of the side plate and bottom plate after multiplying these rates by the contribution rates. In the bucket 200 of the present example prior to the attachment of laminated plate 220 or the like, the side plate contribution rate is 39%, and the bottom plate contribution rate is 61%; accordingly, this is a case where the contribution of the noise emitted from the bottom plate 212 is larger.

In FIG. 35, the noise energy reduction rate Ed is also measured for several constructions other than the present embodiment; the constituent elements of the bucket corresponding to the respective item Nos. are as follows. Here, the bucket constituting the base is a bucket prior to the attachment of noise reducing members such as laminated plate 220, connecting members 215 or the like.

Item 1: all round fillet welding 230 of the laminated plate 220, and plug welding (not shown in the figures) in the parts of "loops" of the vibration mode.

Item 2: all round fillet welding 230 of the laminated plate 220, and plug welding 250 in parts corresponding to the part D.

Item 3: manufacture (no plug welding) so that "floating" is not generated in the laminated plate 220, with the fact that the manufacturing cost is extremely high when all round fillet welding 230 of the laminated plate 220 to the side plate 211 being ignored.

Item 4: connecting members 215 are attached in the part K (no laminated plate).

Item 5: combined use of item 2 and item 4.

Item 6: respective noise energy reduction rates of item 2 and item 4 are added arithmetically.

Item 7: item 1 and item 4 are used in combination.

The noise energy reduction rates in the buckets with the abovementioned respective items will be described in comparative terms. Item 3 is the ideal attachment state of the laminated plate 220; however, this involves an extremely high manufacturing cost, and there are also problems in terms of the occurrence of floating caused by collisions during the use of the bucket, so that this item is not suitable for practical use. On the other hand, in the case of item 2 which uses the first embodiment, it is seen that a reduction rate that is substantially close to that of the ideal attachment state can be achieved. Moreover, in the case of item 1 which differs from Embodiment 1, in addition to the fact that the reduction rate is low, no effect on the bottom plate 212 is obtained, either. It appears that this is due to the fact that the vibrational energy cannot be sufficiently dissipated because of the insufficiency of the attenuating effect. Item 4 is an example that was worked in order to investigate the effect of the connecting members 215 alone; in this case, the reduction rate of the side plate contribution was 7%. It is inferred that this is due to the fact that the vibration amplitude of the peripheral edge parts of the side plate 211 is reduced by the connecting members 215, which also serve to reinforce the bottom plate 212. Thus, the reason that noise is reduced by the reinforcement of the bottom plate 212 is that the rigidity Y of the bucket 200 is increased, and the reason that noise is reduced by the laminated plate 220 is that the damping ratio $\zeta$ of the bucket 200 is increased. It is known that the vibrational energy Ev within a fixed period of time is proportional to "$1/\{2Y\zeta \times (1-\zeta^2)^{1/2}\}$", and if an improvement in rigidity and an improvement in damping characteristics are simultaneously achieved, an effect that is greater than that obtained by simple addition is achieved.

Item 5 is a case in which the first embodiment (item 2) and second embodiment (item 4) are both used together (i. e., the example of FIG. 34). In cases where the second item and fourth item are used independently, the reduction rates are merely added to produce item 6. Accordingly, in item 5, an effect that is greater than additive is obtained as a result of a synergistic effect. Furthermore, in cases where plug welding is performed in the loops (item 1), the laminated plate has no effect on the bottom plate; accordingly, even if connecting members are attached, the effect is reduced (item 7).

In the present example (FIG. 34), a case was described in which the ratio Wp/Hs of the width Wp of the bottom plate 212 to height Hs of the side plate 211 was 1.47 or greater. However, it is also useful even if the ratio Wp/Hs is less than 1.47. Specifically, a noise energy reducing effect can also be obtained in cases where the noise energy of the side plate 211 (where the contribution rate is large depending on the laminated plate 220) drops sufficiently and the contribution of the bottom plate 212 is relatively high.

Figure 36:
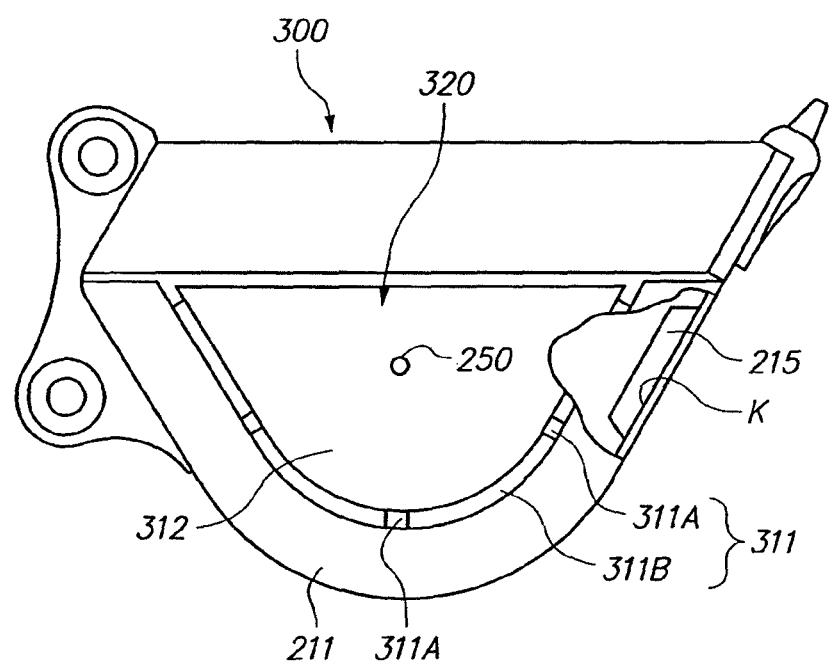
FIG. 36 is a side view of a bucket in an example that combines the first through third embodiments.

Furthermore, an example combining the first through third embodiments is also possible. Specifically, the bucket 300 of the present example shown in FIG. 36, in contrast to the example shown in FIG. 34, is devised so that i) the laminated plate 320 comprises inner plates 311 that have cut-out parts 311a and contact parts 311b, and outer plate 312, like the laminated plate comprising inner plates 111 that have cut-out parts 111a and contact parts 111b and outer plate 112 in FIG. 13, and ii) the inner plates 311 are intermittently welded and the outer plate 312 is welded by all round fillet welding as in the third embodiment.

The noise energy reduction rate Ed is also measured in the case of constructions other than this example; this will be described with reference to FIG. 35. The bucket construction elements are as described in items 8 through 12; as was described above, the bucket that constitutes the base is a bucket prior to the attachment of noise reducing members.

Item 8: as in the third embodiment, the inner plates 311 of the laminated plate 320 are intermittently welded, and the outer plate 312 is welded by all round fillet welding; here, during welding, the fact that the manufacturing cost is extremely high is ignored, and manufacture is performed (without plug welding) so that "floating" does not occur in the laminated plate 320.

Item 9: as in the third embodiment, the inner plates 311 of the laminated plate 320 are intermittently welded, and the outer plate 312 is welded by all round fillet welding; furthermore, plug welding (not shown in the figures) is performed in the parts of the "loops" of the vibration mode.

Item 10: as in the third embodiment, the inner plates 311 of the laminated plate 320 are intermittently welded, and the outer plate 312 is welded by all round fillet welding; furthermore, item 2 is also used in combination.

Item 11: Item 10 and item 4 are used in combination.

Item 12: additive addition of the respective noise energy reduction rates of item 10 and item 4.

The noise energy reduction rates in buckets with the abovementioned items 8 through 12 will be described in a comparative description. Item 8 is similar to item 3; although the reduction rate is high, the degree of practicality is low because of problems of manufacturing cost and floating. In the case of item 9, plug welding is performed in the loops, so that the reduction rate is greatly reduced. In the case of item 10, in which plug welding 250 is performed in the part D as in Embodiment 1 (in contrast to item 9), the positions of plug welding are optimized, so that there is no lowering of the reduction rate, and a practical structure is obtained. In the case of item 11 (i. e., the present embodiment shown in FIG. 36), compared to item 10, connecting members 215 are further attached as in the second embodiment, so that an extremely large reduction rate is obtained. In the case of item 11, as is clear from a comparison with item 12, an effect that is greater than a simple additive effect is obtained as a result of a synergistic effect.

In the abovementioned third embodiment and fourth embodiment, a plurality of cut-out parts 111a and a plurality of protruding parts 131a are formed in the inner plates 111, 131 of the laminated plates 110, 130, and the inner plates 111, 131 are intermittently welded by welding the plurality of cut-out parts 111a or plurality of protruding parts 131a to the side plates 103 of the bucket 101 or inclined wall surfaces 128 of the hopper 125 constituting the machine that is the object of vibration damping.

However, it would also be possible to connect the laminated plates to the machine that is the object of vibration damping by continuously welding only the outer plates, without intermittently welding the inner plates, so that the inner plates are tightly sealed by the outer plates and the machine that is the object of vibration damping.

Figure 37A:
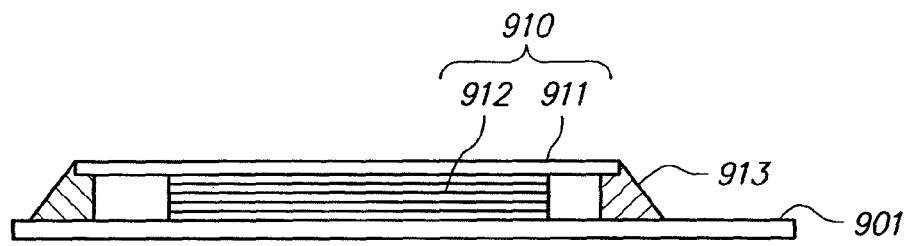
FIGS. 37A, 37B and 37C are side views showing examples in which the machine that is the object of vibration damping and the outer plate are coupled so that the specified number of inner plates are tightly sealed.

Specifically, the laminated plate 910 shown in FIG. 37A consists of a specified number of inner plates 912 that are laminated on the machine 901 that is the object of vibration damping, and an outer plate 911 which is further laminated on the outside of this specified number of inner plates 912, and which has an area that is larger than that of the inner plates 912. The machine 901 that is the object of vibration damping and the outer plate 911 are welded by all round welding (the area of all round welding is indicated by 913) in a state in which the specified number of inner plates 912 are clamped by the machine 901 that is the object of vibration damping and the outer plate 911. As a result, the machine 901 that is the object of vibration damping and the outer plate 911 are connected so that the specified number of inner plates 912 are tightly sealed.

In this example, there are no welded parts on the specified number of inner plates 912 that constrain the deformation of the inner plates 912, and the all round welding prevents the occurrence of rusting due to invasion by rain water; accordingly, a favorable vibration damping performance is obtained.

In FIG. 37A, the outer plate 911 is directly connected to the machine 901 that is the object of vibration damping; however, it would also be possible to connect the outer plate 911 to the machine 901 that is the object of vibration damping with a connecting member interposed.

Figure 37B:
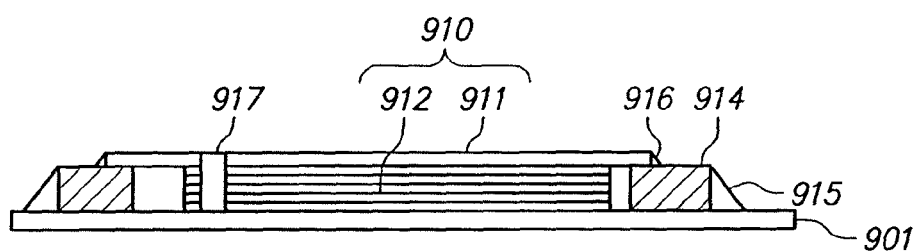

Specifically, as in the case of FIG. 37A, the laminated plate 910 shown in FIG. 37B consists of a specified number of inner plates 912 that are laminated on the machine 901 that is the object of vibration damping, and an outer plate 911 which is further laminated on the outside of the specified number of inner plates 912, and which has an area that is larger than that of the inner plates 912. As a result, the specified number of inner plates 912 are clamped by the machine 901 that is the object of vibration damping and the outer plate 911. Furthermore, a connecting member 914 is disposed on the entire periphery of the outer plate 911. Moreover, the outer plate 911 and the connecting member 914 are connected by all round welding (the area of all round welding is indicated by 916), and the connecting member 914 and the machine 901 that is the object of vibration damping are further connected by all round welding (the area of this all round welding is indicated by 915). As a result, the machine 901 that is the object of vibration damping and the outer plate 911 are connected via the connecting member 914 so that the specified number of inner plates 912 are tightly sealed.

In this example, there are no welded parts on the specified number of inner plates 912 that constrain the deformation of the inner plates 912, and the all round welding prevents the occurrence of rusting due to invasion by rain water; accordingly, a favorable vibration damping performance is obtained.

Furthermore, for example, if the construction is devised so that the specified number of inner plates 912 and the outer plate 911 are connected beforehand by plug welding (the area of plug welding is indicated by 917), and the connecting members 915 are then welded, the positioning of the laminated plate 910 on the machine 901 that is the object of vibration damping can easily be accomplished, so that the manufacturing cost can be lowered. Furthermore, floating of the laminated plate 910 can be prevented by such plug welding.

Furthermore, working in which the connecting members are used as jigs for the positioning of the laminated plate is also possible.

Figure 37C:
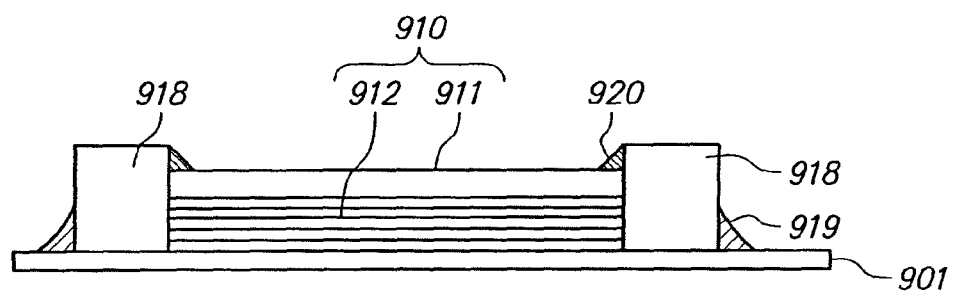

Specifically, the laminated plate shown in FIG. 37C consists of a specified number of inner plates 912 that are laminated on the machine 901 that is the object of vibration damping, and an outer plate 911 which is further laminated on the outside of this specified number of inner plates 912, and which has the same area and same shape as the inner plates 912. As a result, the specified number of inner plates 912 are clamped by the machine 901 that is the object of vibration damping and the outer plate 911. Furthermore, a connecting member 918 is disposed on the entire periphery of the outer plate 911. The laminated plate 910 is positioned by causing the specified number of inner plates 912 and the outer plate 911 to contact the inner wall of the connecting member 918. Furthermore, the outer plate 911 and connecting member 918 are connected by all round welding (the area of all round welding is indicated by 920), and the connecting member 918 and the machine 901 that is the object of vibration damping are further connected by all round welding (the area of this all round welding is indicated by 919). As a result, the machine 901 that is the object of vibration damping and the outer plate 911 are connected via the connecting member 918 so that the specified number of inner plates 912 are tightly sealed.

In this example, there are no welded parts on the specified number of inner plates 912 that constrain the deformation of the inner plates 912, and the all round welding prevents the occurrence of rusting due to invasion by rain water; accordingly, a favorable vibration damping performance is obtained.

Furthermore, the positioning of the laminated plate 910 on the machine 901 that is the object of vibration damping can easily be accomplished using the connecting members 918, so that the manufacturing cost can be further reduced.

Moreover, in FIGS. 37A, 37B and 37C, connection is accomplished by welding; however, working using an adhesive agent or sealing material instead of welding is also possible.

Furthermore, as was described in the third embodiment and fourth embodiment, the machine 901 that is the object of vibration damping in FIGS. 37A, 37B and 37C is, for example, the side plate 103 of a bucket 101, the inclined wall surface 128 of a hopper 125 or the like.

Furthermore, working may also be performed by appropriately combining the laminated plate 910 in FIGS. 37A, 37B and 37C with the working configurations described in the first embodiment, second embodiment, third embodiment or fourth embodiment.

INDUSTRIAL APPLICABILITY

The present invention is useful as a vibration damping device and bucket of a construction machine in which the vibration generated in a base material, side plate or the like is suppressed, so that the noise emitted from the base material or the like is reduced.

The invention claimed is:

1. A bucket for a construction machine comprising:
a side plate (11);
a bottom plate (12), at least a portion of which is connected to the side plate (11);
a laminated plate (20) which is attached to the side plate (11); and
a reinforcing member which is attached to at least a part (16) of the portion where the side plate (11) and the bottom plate (12) are connected,
wherein, before the reinforcing member is attached, a ratio Wp/Hs of a width Wp of the bottom plate (12) to a height Hs of the side plate (11) is 1.47 or greater.

2. The bucket for a construction machine according to claim 1,
wherein the laminated plate (20) is attached to an outside of the side plate (11), and at least a part (16) of the portion where the side plate (11) and the bottom plate (12) are connected on insides of the side plate (11) and the bottom plate (12) is reinforced by a reinforcing member.

3. The bucket for a construction machine according to claim 2, wherein the laminated plate (910) is formed by laminating a plurality of inner plates (912) and an outer plate (911) that is disposed on an outside of the plurality of the inner plates (912), and the specified number of the inner plates (912) are tightly sealed by the outer plate (911) and the side plate (211).

4. A bucket for a construction machine comprising:
a side plate (11);
a bottom plate (12), at least a portion of which is connected to the side plate (11);
a laminated plate (20) which is attached to the side plate (11); and
a reinforcing member attached to a part (K), which forms a loop of a vibration mode, of the portion where the side plate (11) and the bottom plate (12) are connected,
wherein, before the reinforcing member is attached, a ratio Wp/Hs of a width Wp of the bottom plate (12) to a height Hs of the side plate (11) is 1.47 or greater.

5. A bucket for a construction machine comprising:
a side plate (11);
a bottom plate (12), at least a portion of which is connected to the side plate (11);
a laminated plate (20) which is attached to the side plate (11); and
a connecting member connecting the side plate (11) and the bottom plate,
wherein, before the connecting member is attached, a ratio Wp/Hs of a width Wp of the bottom plate (12) to a height Hs of the side plate (11) is 1.47 or greater, and the connecting member (15) that connects the side plate (11) and the bottom plate (12) is attached so that a ratio Wp'/Hs of a substantial width Wp' of the bottom plate (12) to the height Hs is less than 1.47.

\* \* \* \* \*